(12) United States Patent
Inoue

(10) Patent No.: US 9,300,551 B2
(45) Date of Patent: Mar. 29, 2016

(54) SERVICE QUALITY MANAGEMENT SYSTEM AND METHOD

(75) Inventor: Tetsuo Inoue, Tokyo (JP)

(73) Assignee: NEC CORPORATION, Tokyo (JP)

( * ) Notice: Subject to any disclaimer, the term of this patent is extended or adjusted under 35 U.S.C. 154(b) by 351 days.

(21) Appl. No.: 13/989,851

(22) PCT Filed: Aug. 30, 2011

(86) PCT No.: PCT/JP2011/004810
§ 371 (c)(1),
(2), (4) Date: May 28, 2013

(87) PCT Pub. No.: WO2012/073404
PCT Pub. Date: Jun. 7, 2012

(65) Prior Publication Data
US 2013/0301481 A1    Nov. 14, 2013

(30) Foreign Application Priority Data
Nov. 29, 2010   (JP) .................................. 2010-264666

(51) Int. Cl.
*H04L 12/24*         (2006.01)
*H04L 12/70*         (2013.01)
(Continued)

(52) U.S. Cl.
CPC ............ *H04L 41/5051* (2013.01); *H04L 47/00* (2013.01); *H04L 65/80* (2013.01); *H04L 41/5022* (2013.01); *H04L 43/026* (2013.01); *H04W 84/047* (2013.01)

(58) Field of Classification Search
CPC .................................................. H04L 41/5051
See application file for complete search history.

(56) References Cited

U.S. PATENT DOCUMENTS

2002/0143899 A1*  10/2002  Di Perna ...................... 709/219
2006/0160551 A1*   7/2006  Matoba et al. ................ 455/509
(Continued)

FOREIGN PATENT DOCUMENTS

JP     2001-359073 A    12/2001
JP     2006-504363 A     2/2006
(Continued)

OTHER PUBLICATIONS

3GPP TR 23.831 v10.0.0 (Sep. 2010); 3rd Generation Partnership Project; Technical Specification Group Services and System Aspects; IP Multimedia Subsystem (IMS) Service Continuity; Inter-UE Transfer enhancements; Stage 2 (Release 10).*
(Continued)

*Primary Examiner* — Charles C Jiang
*Assistant Examiner* — Thad Defauw

(57) ABSTRACT

Provided is a service quality management system 10 including a service quality management device 51, 52 that belongs to a communication network and manages at least one relaying device 31, 32, a control traffic processing device 41, 42 that processes a control traffic for providing a user terminal 21, 22 with a media content through the communication network, and a service providing device 60 that provide the media contents, in which the control traffic processing device includes a receiving unit that receives a service request concerning the media content from the user terminal, an information adding unit that generate, on the basis of the service request received by the receiving unit, a service request in which device identification information for identifying the service quality management device belonging to the same communication network is added, and a transmitting unit that transmits, to the service providing device, the service request having the device identification information added thereto.

6 Claims, 16 Drawing Sheets

(51) Int. Cl.
*H04L 29/06* (2006.01)
*H04W 84/04* (2009.01)
*H04L 12/26* (2006.01)

(56) References Cited

U.S. PATENT DOCUMENTS

| | | | |
|---|---|---|---|
| 2008/0189416 A1 | 8/2008 | Yamada et al. | |
| 2009/0190506 A1* | 7/2009 | Belling et al. | 370/259 |
| 2013/0223208 A1* | 8/2013 | Liao et al. | 370/229 |

FOREIGN PATENT DOCUMENTS

| JP | 2007-074740 A | 3/2007 |
|---|---|---|
| JP | 2008-129856 A | 6/2008 |
| JP | 2008-193430 A | 8/2008 |
| JP | 2009-135727 A | 6/2009 |

OTHER PUBLICATIONS

3GPP, "3rd Generation Partnership Project; Technical Specification Group Services and System Aspects; IP Multimedia Subsystem (IMS) Service Continuity; Inter-UE Transfer enhancements; Stage 2 (Release 10)", 3GPP TR 23.831, V10.0.0. Sep. 2010. Cited in EP Search Report.
The Extended European Search Report of EP Application No. 11845015.4 dated on Jun. 26, 2014.
International Search Report of PCT Application No. PCT/JP2011/004810 mailed on Nov. 8, 2011.

* cited by examiner

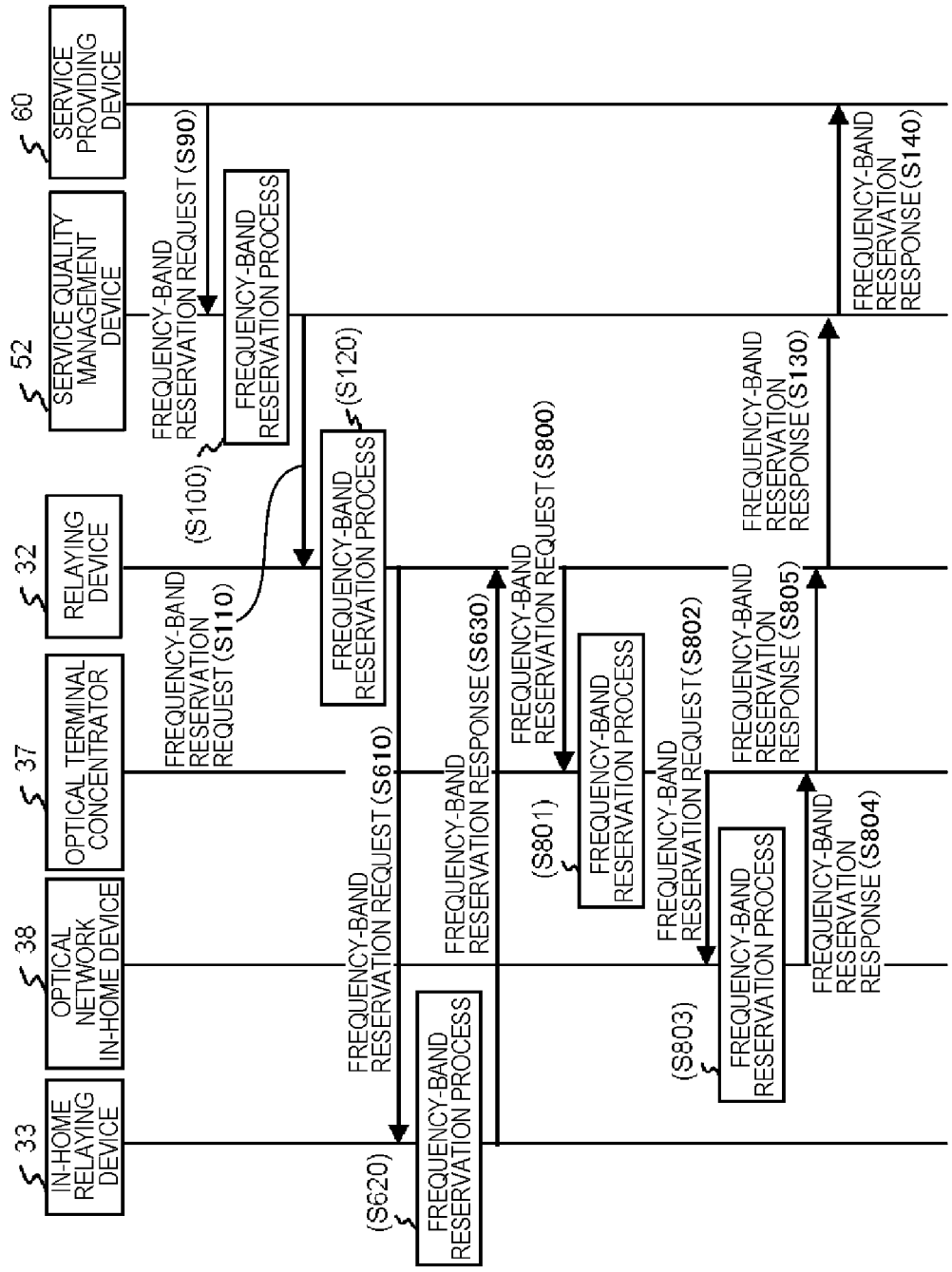

SERVICE QUALITY MANAGEMENT SYSTEM AND METHOD

This application is a National Stage Entry of PCT/JP2011/004810 filed Aug. 30, 2011, which claims priority from Japanese Patent Application 2010-264666 filed Nov. 29, 2010, the contents of all of which are incorporated herein by reference, in their entirety.

TECHNICAL FIELD

The present invention relates to a technique for managing quality of service in plural communication networks.

BACKGROUND ART

Recently, various communication services have been provided through networks such as the Internet. Of the various communication services, real time supply is highly important for services that provide media such as audio materials and movies, and discontinuation of communication, communication delay, and other communication troubles are more likely to directly lead to a deterioration in the quality of the services.

To address this issue, there are various techniques proposed for managing quality of service (QoS) of the mobile communication network and the fixed communication network, as described in Patent Documents below.

RELATED DOCUMENT

Patent Document

Patent Document 1: Japanese Patent Application Laid-open No. 2009-135727
Patent Document 2: Japanese Patent Application Laid-open No. 2008-129856
Patent Document 3: Japanese Patent Application Laid-open No. 2007-74740
Patent Document 4: Japanese Patent Application (Translation of PCT Application) Laid-open No. 2006-504363

SUMMARY OF THE INVENTION

However, the conventional QoS management methods manage communication services within a communication network provided by each network operator, and do not manage communication services in an environment in which plural management forms exist, for example, the communication network and the service providing device are managed by different managers. In other words, if the conventional QoS management methods are applied to the environment in which plural management forms exist, separate QoS policies are managed for each of the management forms, so that it is difficult to achieve QoS control in an appropriate end-to-end manner (E2E QoS).

These problems also occur in a case where communication services are provided across different communication networks in such a case as a fixed mobile convergence (FMC) services involving fixed communications and mobile communications. For example, the FMC employs communication networks extending across the mobile communication network and the fixed communication network, and manages relaying devices in each of the communication networks by using independent QoS policies. Thus, by applying the conventional QoS management method to this FMC, it is not possible to achieve QoS control in an appropriate end-to-end manner between user terminals or between a user terminal and a service providing device in the FMC.

Further, these problems do not occur only in the above-described FMC system. For example, the range of management of the QoS policy is set according to communication protocols, network operators, installation areas, and the like.

An object of the present invention is to provide a technique for managing quality of communication services in an appropriate manner.

Each mode of the present invention employs the following configurations to solve the problems described above.

A first aspect of the present invention relates to a service quality management system including a first service quality management device that belongs to a first communication network and manages at least one relaying device belonging to the first communication network, a first control traffic processing device that belongs to the first communication network and processes a control traffic for providing a user terminal with a media content through the first communication network, and a service providing device that provides the media content. In the service quality management system according to the first aspect, the first control traffic processing device includes a receiving unit that receives a service request concerning the media content from the user terminal, an information adding unit that generates, on the basis of the service request received by the receiving unit, a service request in which device identification information for identifying the first service quality management device belonging to the same communication network is added, and a transmitting unit that transmits, to the service providing device, a service request having the device identification information added thereto.

A second aspect of the present invention relates to a control traffic processing device that belongs to a communication network, can communicate to a service quality management device managing at least one relaying device belonging to the communication network and to a service providing device providing a media content, and processes a control traffic for providing a user terminal with the media content through the communication network. The control traffic processing device according to the second aspect includes a receiving unit that receives a service request concerning the media content from the user terminal, an information adding unit that generates, on the basis of the service request received by the receiving unit, a service request in which device identification information for identifying the service quality management device belonging to the same communication network is added, and a transmitting unit that transmits the service request having the device identification information added thereto to the service providing device.

A third aspect of the present invention relates to a service quality management method performed by a system including a first service quality management device that belongs to a first communication network and manages at least one relaying device belonging to the first communication network, a first control traffic processing device that belongs to the first communication network and processes a control traffic for providing a first user terminal with a media content through the first communication network, a second control traffic processing device that belongs to a second communication network connected to the first communication network through a predetermined communication network and processes a control traffic for providing a second user terminal with a media content through the second communication network, and a service providing device that provides a media contents. In the service quality management method according to the third aspect, the first control traffic processing device performs: receiving a service request transmitted from the first user terminal; acquiring, from the received service request, terminal identification information for identifying a user terminal currently receiving the media content through the second communication network as information on a terminal currently receiving a service; identifying the second control traffic processing device belonging to the second communication network to which a user terminal identified on the basis of the acquired information on a terminal currently receiving a service can communicate; generating a service request in which device identification information for identifying the first service quality management device is added as information on a forwarding destination device; and transmitting, to the identified second control traffic processing device, the service request having the information on a forwarding destination device added thereto.

It should be noted that, as another aspect of the present disclosure, the present invention may provide a program that realize any of the configurations described above, or may provide a computer-readable storage medium that stores such a program.

According to each of the aspects of the present invention, it is possible to provide a technique for appropriately managing quality of the communication services.

BRIEF DESCRIPTION OF THE DRAWINGS

FIG. 16 is a sequence chart illustrating an example of operations performed by the QoS management system according to the second modification example.

DESCRIPTION OF EMBODIMENTS

Hereinbelow, a service quality management system according to an exemplary embodiment of the present invention will be described with reference to the drawings. Each exemplary embodiment described below is merely an example, and the present invention is not limited to the configuration of each of the exemplary embodiments described below.

[First Exemplary Embodiment]

Figure 1:
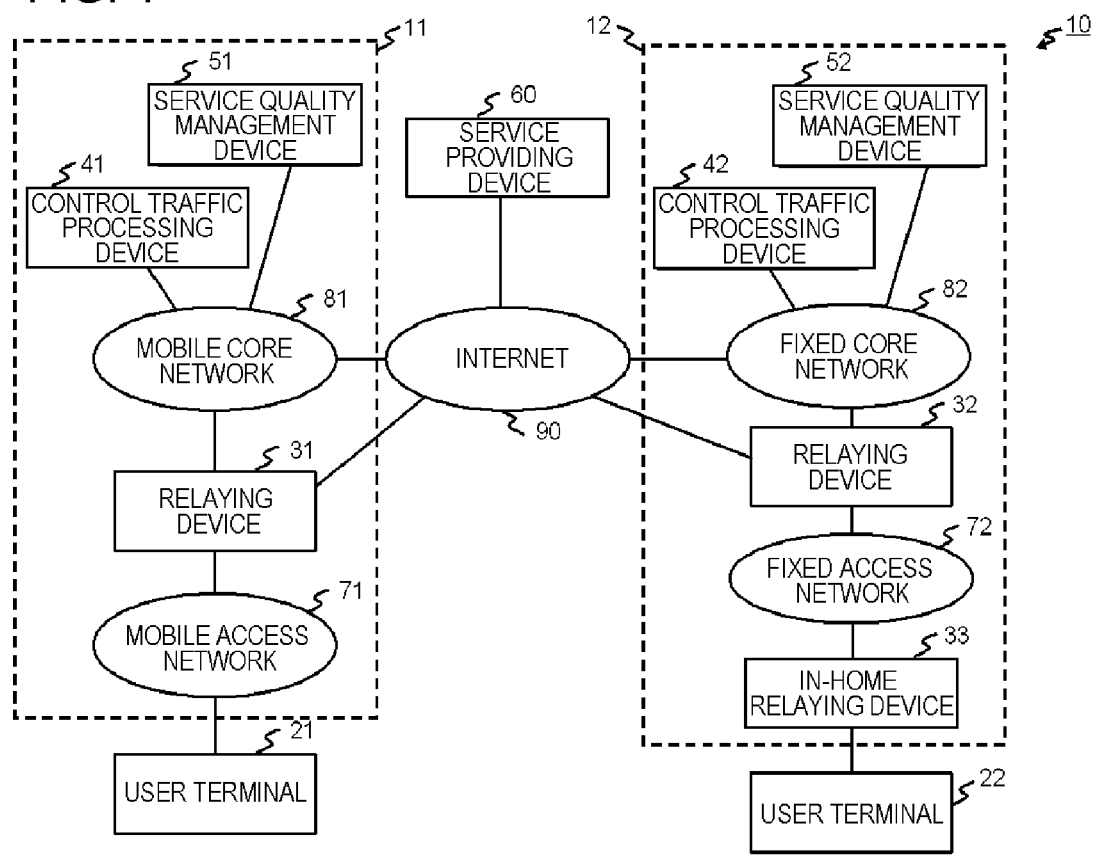
FIG. 1 is a schematic view illustrating an example of a configuration of a service quality management system (QoS management system) according to a first exemplary embodiment.

FIG. 1 is a schematic view illustrating an example of a configuration of a service quality management system (hereinafter, referred to as a QoS management system) 10 according to a first exemplary embodiment. The QoS management system 10 includes a public communication network such as the Internet 90, a specific communication network such as a mobile network 11 and a fixed network 12, and a service providing device 60.

With the configuration example illustrated in FIG. 1, the mobile network 11 and the fixed network 12 can communicate with the service providing device 60 only through the public communication network without passing through other specific communication networks. For example, the QoS management system 10 provides each user terminal 21 and 22 with viewing services of media contents transmitted from the service providing device 60.

It should be noted that, in the first exemplary embodiment, the FMC system has been described as an example of plural communication networks. However, the exemplary embodiment of the present invention does not limit the plural communication networks to the above-described system. The QoS management system 10 according to the exemplary embodiment of the present invention may be formed by plural fixed communication networks each managing QoS policy independently, or may be formed by similar plural mobile communication networks.

The mobile network 11 is a communication network that provides mobile communication services. The mobile network 11 includes a mobile access network 71, a relaying device 31, a mobile core network 81, a control traffic processing device 41, and a service quality management device (hereinafter, referred to as a QoS management device) 51.

The mobile access network 71 is a communication network for connecting a wireless mobile terminal (for example, user terminal 21) such as a mobile phone and a mobile personal computer (PC) with the mobile network 11 in a manner that they can communicate with each other. The mobile access network 71 includes, for example, a base station (Node B) for wirelessly communicating with the user terminal 21, and a base-station control device (RNC) for controlling each base station. The mobile access network 71 is connected to the mobile core network 81 through the relaying device 31 in a manner that they can communicate with each other.

The relaying device 31 is a relaying device such as a router. The relaying device 31 relays, through the Internet 90 to the service providing device 60, upstream traffic transmitted from the user terminal 21 while controlling frequency band of a transmission line in response to a request from the QoS management device 51 and the like. Further, the relaying device 31 relays, through the mobile access network 71 to the user terminal 21, downstream traffic transmitted from the service providing device 60. Note that, although only one relaying device 31 is illustrated in FIG. 1, plural relaying devices 31 are generally provided. Further, in FIG. 1, an example is given in which the relaying device 31 is disposed between the mobile core network 81 and the mobile access network 71. However, plural relaying devices 31 may be provided in the mobile core network 81 and the mobile access network 71.

The mobile core network 81 is a mobile network that performs switching control or other processes in response to control traffic transmitted from the mobile access network 71. The mobile core network 81 includes, for example, a mobile services switching center (MSC) or a session initiation protocol (SIP) server. The mobile core network 81 is connected with the Internet 90 in a manner that they can communicate with each other.

The control traffic processing device 41 processes control traffic for providing the user terminal 21 through the mobile network 11 with viewing services of media contents transmitted from the service providing device 60. More specifically, the control traffic processing device 41 has an access authentication function from the user terminal 21 to the service providing device 60, a function of relaying service request messages (hereinafter, also referred to as a service request) from the user terminal 21 through the mobile core network 81 and the Internet 90 to the service providing device 60, and other functions. The service request message includes a request to start a service, a request to terminate a service, and a request to change services. Below, descriptions will be made without specifying types of the service requests unless otherwise needed.

The QoS management device 51 manages communication resources of at least one relaying device 31 contained in the mobile network 11. In this specification, the communication resource not only means the communication frequency band, but also means the concept including various technical elements relating to a communication relaying process performed by the relaying device 31. The technical elements include, for example, currently used frequency band, the frequency band reserved, operation states of the relaying device 31, and information used in prioritizing control. With this configuration, the QoS management device 51 has, for example, a function of managing states of the relaying device 31, a function of defining the maximum frequency band for each QoS class obtained by logically classifying physical transmission lines of the relaying device 31, and a function of dynamically managing the usage state and the reservation state of the frequency bandwidth for each of the QoS classes. The term "QoS class" represents, for example, priority for forwarding the internet protocol (IP) traffic, and the QoS class includes eight grades (from zero to seven). Allocation of QoS class for each of the services is determined, for example, within each network operator and between network operators on the basis of a certain criterion.

For example, usage states of frequency bandwidth are managed for each QoS class and for each type of media being used, and include the reference numbers of the user terminal used, the IP addresses of the transmission source, the transmission-source port numbers, the IP addresses of the transmission-destination, the transmission-destination port numbers, IP types, frequency bandwidths of upstream and downstream traffic, and information on whether or not the frequency band is being reserved or being used. The relaying device 31 uses each of the QoS classes to perform prioritizing control at the time of packet relaying. The type of media used represents a type of provided media contents such as a video, voice, and data.

The service providing device 60 is connected with the Internet 90 in a communicable manner, and provides media contents (software contents) such as online games, animations, music, and videos in response to a request from the user terminals 21 and 22. The exemplary embodiment of the present invention does not limit media contents provided by the service providing device 60.

The fixed network 12 is a communication network that provides the user terminal 22 with the fixed communication services. The fixed network 12 includes, for example, an in-home relaying device 33, a fixed access network 72, a relaying device 32, a fixed core network 82, a control traffic processing device 42, and a QoS management device 52. In terms of functions relating to the present invention, the relaying device 32, the control traffic processing device 42, and the QoS management device 52 each basically have a similar function to those of the relaying device 31, the control traffic processing device 41, and the QoS management device 51, each of which belongs to the mobile network 11. However, in the first exemplary embodiment, each of the relaying device 32, the control traffic processing device 42, and the QoS management device 52 differs from each of the nodes 31, 41, and 51 belonging to the mobile network 11 in the communication forms (mobile network versus fixed network) for processing targets and management target, and hence, both are different in terms of functions relating to these forms of communication.

The in-home relaying device 33 is a relaying device located between the fixed access network 72 and the user terminal 22 such as a personal computer (PC), a fixed phone, and a high definition television (HDTV). For example, the in-home relaying device 33 includes a broadband optical router for personal use, a set top box (STB) of video on demand (VoD), and a home gateway (HGW). The in-home relaying device 33 relays upstream traffic from the user terminal 22 to the relaying device 32 through fixed access network 72 while controlling frequency band of the transmission line, and relays downstream traffic from the relaying device 32 to the user terminal 22. The in-home relaying device 33 corresponds to a relaying device belonging to lower hierarchy of the relaying device 32.

The fixed access network 72 is a communication network that terminates communication lines such as fiber optics, an asymmetric digital subscriber line (ADSL), an integrated services digital network (ISDN), and telephone line for connecting the fixed network 12 and the user terminal 22.

The relaying device 32 relays upstream traffic from the user terminal 22 through the Internet 90 to the service providing device 60 while controlling frequency band of the transmission line in response to a request from the QoS management device 52 and the like, and relays downstream traffic from the service providing device 60 to the user terminal 22 through the fixed access network 72 and the in-home relaying device 33. Note that, in FIG. 1, an example is given in which the relaying device 32 exists between the fixed core network 82 and the fixed access network 72. However, plural relaying devices 32 may exist within the fixed core network 82 and the fixed access network 72.

Further, the relaying device 32 contained in the fixed network 12 manages IP information on the in-home relaying device 33, which corresponds to a relaying device in the lower layer. The IP information may include an IP type, an IP address, a port number, and a virtual local area network (VLAN) tag. Upon receiving a frequency band request from the QoS management device 52, the relaying device 32 forwards the frequency band request to the in-home relaying device 33 to be managed and serving as a frequency-band controlled target. This frequency band request includes a frequency-band reservation request, a frequency-band use request, a request to change frequency bands, and a request to release a frequency band.

The fixed core network 82 is a communication network that performs switching control according to control traffic transmitted from the fixed access network 72. The fixed core network 82 includes, for example, a session initiation protocol (SIP) server, or public switched telephone networks (PSTN) switching station. The fixed core network 82 is connected with the Internet 90 in a communicable manner.

The control traffic processing device 42 processes control traffic to provide the user terminal 22 through the fixed network 12 with viewing services of media contents provided by the service providing device 60. For example, the control traffic processing device 42 has an access authentication function from the user terminal 22 to the service providing device 60, and a function of relaying service request messages from the user terminal 22 through the fixed core network 82 and the Internet 90 to the service providing device 60.

The QoS management device 52 manages communication resources of at least one relaying device 32 contained in the fixed network 12. For example, the QoS management device 52 has a function of managing states of the relaying device 32, a function of defining the maximum frequency band for each class in which physical transmission lines of the relaying device 32 are logically classified, and a function of dynamically managing the usage state and the reservation state of the frequency band of each class.

The user terminals 21 and 22 can communicate with the service providing device 60 through the mobile network 11 or the fixed network 12, and has a general function that enables viewing media contents provided from the service providing device 60. The exemplary embodiment of the present invention does not limit the configuration of the user terminals 21 and 22, and hence, specific explanation of the configuration of the user terminals 21 and 22 is not made.

[Device Configuration]

Described below are the process configurations of the control traffic processing devices 41 and 42, and the service providing device 60 included in the QoS management system 10.

Figure 2:
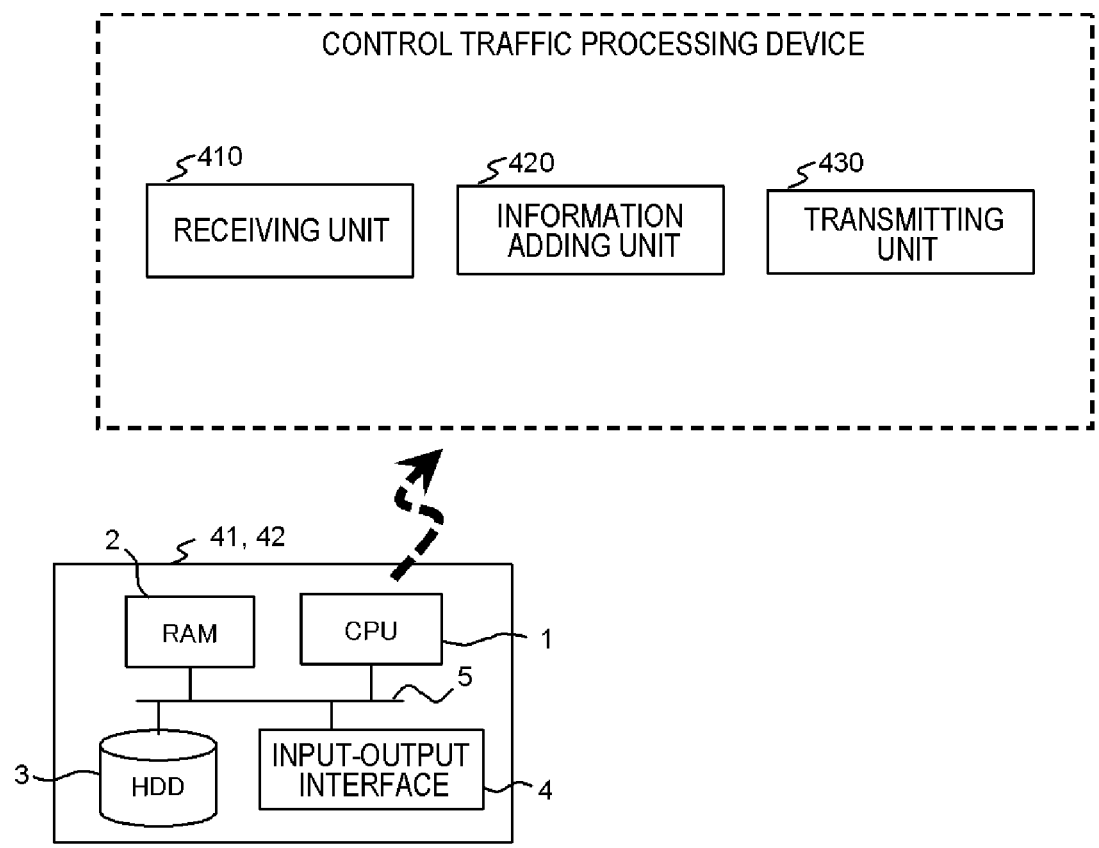
FIG. 2 is a schematic view illustrating an example of a process configuration of a control traffic processing device according to the first exemplary embodiment.

FIG. 2 is a schematic view illustrating an example of process configurations of the control traffic processing devices 41 and 42 according to the first exemplary embodiment. The control traffic processing devices 41 and 42 have the same process configuration in terms of configurations relating to the present invention, and hence, only the control traffic processing device 41 will be described below. The control traffic processing devices 41 and 42 differ in the communication forms for the processing targets and the management targets (mobile network versus fixed network), and hence, these may have different configurations in terms of the process configuration (not illustrated) relating to the forms of communication.

As illustrated in FIG. 2, the control traffic processing device 41 has a hardware configuration including the central processing unit (CPU) 1, a memory such as the random access memory (RAM) 2, read only memory (ROM, not illustrated), and the hard disk (HDD) 3, and the input-output interface 4. These hardware elements are connected to each other through a bus 5 for example. The input-output interface 4 includes a network interface that can realize a predetermined communication system that the mobile network 11 or fixed network 12 employs. Note that this exemplary embodiment does not limit the hardware configuration of the control traffic processing device 41.

The control traffic processing device 41 realizes the following processing units, for example, with the CPU 1 running a program stored in the memory. As illustrated in FIG. 2, the control traffic processing device 41 includes a receiving unit 410, an information adding unit 420, and a transmitting unit 430.

The receiving unit 410 receives a service request transmitted from the user terminal 21. In the mobile network 11, this service request is received by the receiving unit 410 of the control traffic processing device 41 through the mobile access network 71, the relaying device 31, and the mobile core network 81. In the fixed network 12, this service request is transmitted from the user terminal 22, and is received by the receiving unit 410 of the control traffic processing device 42 through the in-home relaying device 33, the fixed access network 72, the relaying device 32, and the fixed core network 82.

The service request includes, for example, service information, IP information for control on the user terminal 21, IP information for media on the user terminal 21, a type of request indicating any one of the following: starting, changing and terminating, a user terminal number, user authentication information, service media information, and IP information on the control traffic processing device 41. The service information represents identification information on requested services such as VoD and online games. The IP information may include an IP type, an IP address, port numbers, and a VLAN tag. The user terminal number represents identification information with which the QoS management system 10 can identify a user of the user terminal 21 or 22, and is used, for example, in access authentication for the mobile network 11 or fixed network 12, or access authentication for a specific service. The user authentication information represents authentication information used in a user access authentication process made through the mobile network 11 or fixed network 12, and is, for example, a password. The service media information represents detailed information on media of required services such as voice, video, and data. Note that this exemplary embodiment does not limit information contained in the service request.

The information adding unit 420 generates a service request on the basis of the service request received by the receiving unit 410 by adding device identification information to identify a QoS management device 51 contained in the communication network (mobile network 11), which is the same communication network to which the control traffic processing device 41 belongs. This device identification information includes, for example, a name (including domain name) of a network device that can access the QoS management device 51 from another communication network, and is stored in the memory of the control traffic processing device 41 in a manner that can be adjusted in advance. The device identification information may be IP information containing the IP address and the IP port number.

The transmitting unit 430 transmits, to the service providing device 60, the service request having the device identification information added thereto by the information adding unit 420. In the case where there are plural service providing devices, the transmitting unit 430 identifies, as the transmission destination, a service providing device 60 corresponding to the user terminal number and the service information contained in the received service request from among plural service providing devices. In the mobile network 11, this service request is transmitted through the mobile core network 81 and the Internet 90 to the service providing device 60. In the fixed network 12, this service request is transmitted through the fixed core network 82 and the Internet 90 to the service providing device 60.

Figure 3:
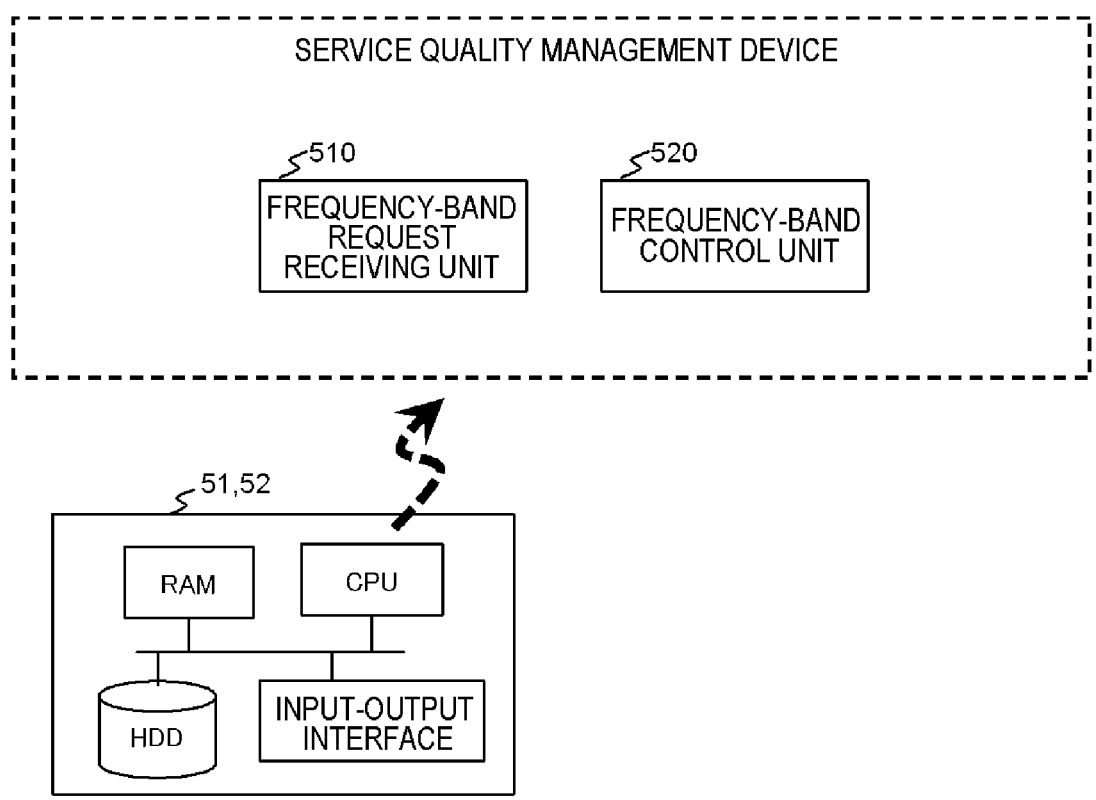
FIG. 3 is a schematic view illustrating an example of a process configuration of a quality of service (QoS) management device according to the first exemplary embodiment.

FIG. 3 is a schematic view illustrating an example of a process configuration of the QoS management devices 51 and 52 according to the first exemplary embodiment. The QoS management devices 51 and 52 have the same process configuration in terms of the configurations relating to the present invention, and hence, only the QoS management device 51 will be described below. The QoS management devices 51 and 52 are different in the communication forms for the processing target and the management target (mobile network versus fixed network), and hence, these may have different configurations in terms of the process configuration (not illustrated) relating to the forms of communication.

Although this exemplary embodiment does not limit the hardware configuration of the QoS management device 51, the QoS management device 51 has, for example, a hardware configuration similar to that of the control traffic processing device 41 (see FIG. 2). The QoS management device 51 realizes the following processing units, for example, with the CPU running a program stored in the memory. As illustrated in FIG. 3, the QoS management devices 51 and 52 include a frequency-band request receiving unit 510, and a frequency-band control unit 520.

The frequency-band request receiving unit 510 receives a frequency band request from the service providing device 60. In the mobile network 11, the request from the service providing device 60 is transmitted from the service providing device 60 through the Internet 90 and the mobile core network 81 to the QoS management device 51. In the fixed network 12, the request from the service providing device 60 is transmitted from the service providing device 60 through the Internet 90 and the fixed core network 82 to the QoS management device 52.

The frequency-band control unit 520 performs the frequency-band reservation process, the frequency-band use process, a frequency-band changing process, or a frequency-band releasing process in response to the frequency band request.

The frequency-band control unit 520 manages the relaying device 31 (or relaying device 32) contained in the communication network (mobile network 11 or fixed network 12) to which this frequency-band control unit 520 belongs. More specifically, the frequency-band control unit 520 manages usage states of the communication frequency bandwidth and reservation states of the communication frequency bandwidth for each IP interface of the relaying device 31. Regarding each IP interface, the upstream and the downstream frequency bandwidths used and the state of the frequency band used (currently used or currently reserved) are managed for each of the logically classified QoS class and for each type of media used. The frequency-band control unit 520 retains in advance the upper limit values of the frequency bandwidths that can be used for the upper stream traffic and the downstream traffic for each of the QoS classes and for each of the types of media used. The frequency-band control unit 520 manages the total amount of the frequency bandwidths of all the classes and all the types of the media used so as to be less than or equal to the upper limit value of the frequency band of the entire IP interface.

Upon receiving the frequency band request from the service providing device 60, the frequency-band control unit 520 identifies an IP interface in the relaying device 31 and the relaying device 32 serving as the target of the frequency-band control in accordance with the quality-of-service policy (hereinafter, referred to as a QoS policy) contained in the frequency band request. On the basis of management information (including the upper limit value of the frequency bandwidth) of the relaying device 31 as described above, the frequency-band control unit 520 determines whether or not the frequency bandwidth according to the QoS policy contained in the frequency-band reservation request can be secured (reserved) for the identified IP interface.

In this specification, the QoS policy means specific information with which QoS of the required media contents such as IP flow, the QoS class, the frequency bandwidth used, and media information and the like are determined. The IP flow represents a combination of an IP type, an IP address, a port number, VLAN tag and the like, concerning the transmission source and the transmission destination. For example, the IP flow is complied on the basis of a combination of the IP information for medium on the user terminal contained in the service request and the IP information for the medium on the service providing device 60 serving as a source of providing the media contents. The QoS class represents a QoS class used for providing the required media contents. The frequency bandwidth used represents the upstream and the downstream frequency bandwidths actually determined in the mobile network 11 or the fixed network 12 in response to the service request. The media information represents information including a type of the required media contents such as voice, video and data, a codec type, and a signal-compressing system of the required media contents and the like. Note that this exemplary embodiment does not limit the specific information contained in the QoS policy.

The frequency-band control unit 520 uses information on the IP flow of the QoS policy contained in the frequency-band reservation request, and identifies the IP interface of the target of the frequency band control. For the QoS class of the QoS policy, the QoS class identified on the basis of the media information, and the type of media used in the determined IP interface, the frequency-band control unit 520 determines on the basis of the management information as described above whether or not the upstream and the downstream frequency bandwidths used for the QoS policy can be secured.

After it is determined that the frequency bandwidths can be secured, the frequency-band control unit 520 updates the management information on the relaying device 31 with the QoS policy information. For example, in the case where the QoS policy contained in the frequency-band reservation request indicates that 10 Mbps (megabit per second) is reserved for the downstream traffic of video contents, and it is determined that such a frequency bandwidth can be secured, 10 Mbps of the frequency bandwidth used for the target media type used (video) of the target QoS class of the target IP interface is added, and the state of the added frequency bandwidth used is set to be the reserved state. After performing the frequency-band reservation process as described above, the frequency-band control unit 520 transmits the frequency-band reservation request containing a similar QoS policy and the usage state (reservation) to the relaying device 31 determined as the target for controlling the frequency band.

In the case where the frequency-band request receiving unit 510 receives the frequency-band request after the frequency band is reserved as described above, the frequency-band control unit 520 changes the state of use contained in the management information of the relaying device 31 from the reservation state into the in-use state, and transmits the frequency-band use request containing a similar QoS policy to the relaying device 31 determined as the target for controlling the frequency band. The relaying device 31 receiving the frequency-band use request updates the management information in terms of the IP interface in this relaying device 31 in a similar manner to the frequency-band control unit 520 described above, thereby performing the frequency-band reservation process. The relaying device 31 returns the frequency-band reservation response containing information indicating the results of the frequency-band reservation process to the frequency-band control unit 520. The results of the frequency-band reservation process include a result of determination as to whether the frequency band is secured as required.

Upon receiving, from the relaying device 31, the frequency-band reservation response containing information indicating that the frequency band can be secured as required as a result of the frequency-band reservation process, the frequency-band control unit 520 returns, to the service providing device 60, the frequency-band reservation response containing the results of the frequency-band reservation process performed by the relaying device 31 and the results of the frequency-band reservation process performed by this frequency-band control unit 520 itself.

On the other hand, if receiving the frequency-band reservation response containing information indicating that the frequency band cannot be secured as requested as a result of the frequency-band reservation process and judging that the frequency band cannot be secured as required as a result of the frequency-band reservation process performed by this frequency-band control unit 520 itself, the frequency-band control unit 520 may change the QoS policy required by the frequency-band reservation request from the service providing device 60, and perform the frequency-band reservation process again using the changed QoS policy. This change of the QoS policy can be performed, for example, through change of QoS class (lowering the priority of traffic forwarding), change of the frequency bandwidth used (reducing the frequency bandwidth used), or change of the relaying device 31 serving as the target for controlling the frequency band (setting the detour). The frequency-band control unit 520 may return, to the service providing device 60, a frequency-band reservation response containing information indicating that the frequency band cannot be secured as a result of the frequency-band reservation process, without changing the QoS policy as described above.

If the frequency band can be secured as a result of the frequency-band reservation process performed by the frequency-band control unit 520 and the relaying device 31 using the QoS policy changed as described above, the frequency-band reservation response containing the change of the QoS policy as a result of the frequency-band reservation process and the information on the changed QoS policy is returned to the service providing device 60. If the frequency band cannot be secured even after the change of the QoS policy, the frequency-band reservation response containing information indicating that the frequency band cannot be secured as a result of the frequency-band reservation process is returned to the service providing device 60.

If receiving a request to change the frequency band from the service providing device 60, the frequency-band control unit 520 updates the management information on the relaying device 31 as described above on the basis of the QoS policy contained in the request from the service providing device 60. Further, if receiving a request to release the frequency band from the service providing device 60, the frequency-band control unit 520 performs the process of releasing the frequency band, the process being the target of the request.

Figure 4:
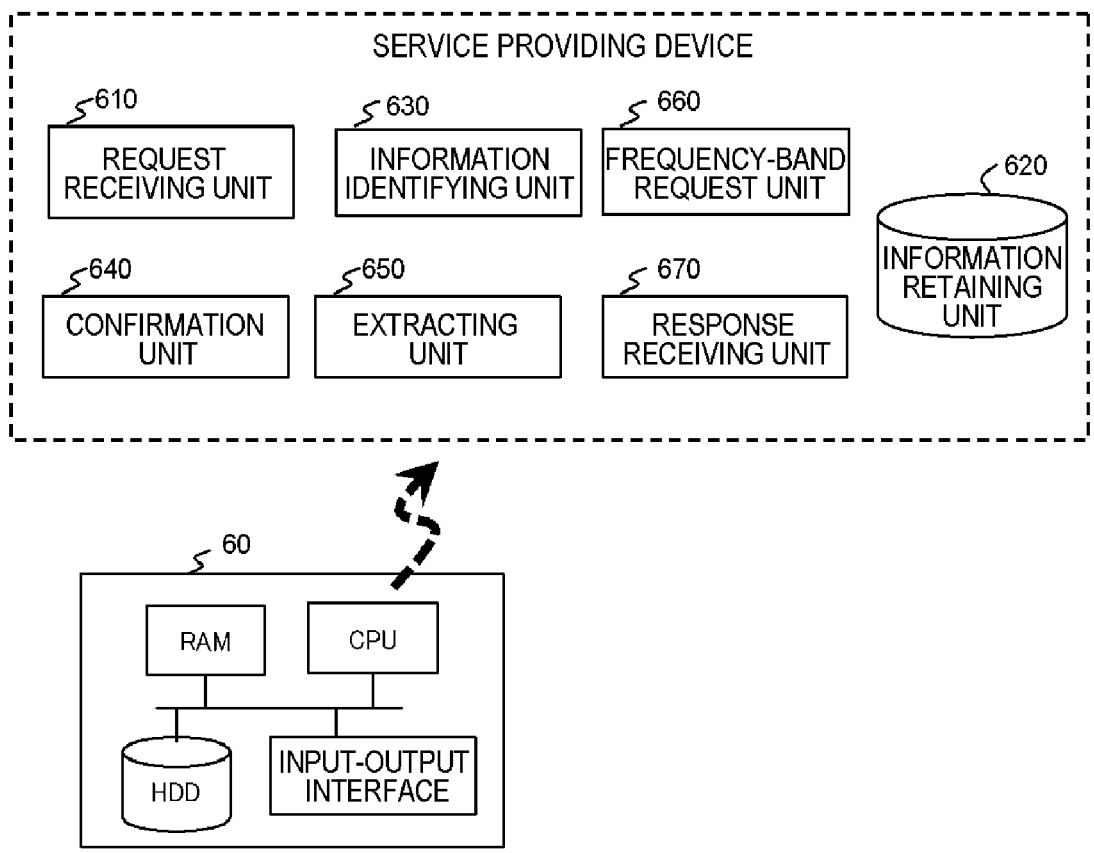
FIG. 4 is a schematic view illustrating an example of a process configuration of a service providing device according to the first exemplary embodiment.

FIG. 4 is a schematic view illustrating an example of a process configuration of the service providing device 60 according to the first exemplary embodiment. Although the exemplary embodiment of the present invention does not limit the hardware configuration of the service providing device 60, the service providing device 60 has, for example, a hardware configuration similar to the control traffic processing device 41 described above (see FIG. 2). The service providing device 60 realizes the following processing units, for example, with the CPU running a program stored in the memory.

As illustrated in FIG. 4, the service providing device 60 includes, for example, a request receiving unit 610, an information retaining unit 620, an information identifying unit 630, a confirmation unit 640, an extracting unit 650, a frequency-band request unit 660, and a response receiving unit 670 and the like.

The request receiving unit 610 receives a service request transmitted from the control traffic processing device 41 or 42. In this service request, the device identification information with which the QoS management device 51 or 52 can be identified is added as described above.

The information retaining unit 620 retains quality determining information for determining the QoS for each user. The quality determining information contains, for example, information indicating user's will (desire) with which the quality of service is determined, for example, leaving determination of the quality level to the system, desiring chargeable and high-quality services, and desiring services with free-of-charge quality. The quality determining information may be retained by the information retaining unit 620 in a form in which the quality determining information is contained in subscriber contract information on each user associated with the user terminal number. Further, the quality determining information may contain information indicating the required quality level, or may contain specific information indicating the QoS policy.

If the service request received by the request receiving unit 610 is a request to start a service or a request to change services, the information identifying unit 630 acquires the quality determining information corresponding to these requests from the information retaining unit 620. For example, the information identifying unit 630 searches the information retaining unit 620 using a user terminal number contained in the service request to extract subscriber contract information registered in association with the user terminal number, thereby acquiring the quality determining information concerning the user on the basis of the subscriber contract information. If the information retaining unit 620 does not retain the quality determining information corresponding to the received service request, the information identifying unit 630 outputs to that effect.

The extracting unit 650 extracts device identification information added by the control traffic processing device 41 or 42 from the service request received by the request receiving unit 610. The extracted device identification information indicates the QoS management device 51 or 52.

The frequency-band request unit 660 determines the QoS policy of the media content requested by the received service request or the QoS policy, for example, on the basis of the above-described quality determining information, the service information contained in the service request, and the service media information. The QoS policy is determined through a general QoS policy determining method, and hence, will not be specifically described in this specification.

The frequency-band request unit 660 transmits a request to reserve the frequency band containing the determined QoS policy, a request to use the frequency band, or a request to change the frequency bands to the QoS management device 51 or 52 determined on the basis of the device identification information extracted by the extracting unit 650. Further, if the request to terminate the service is received, the frequency-band request unit 660 transmits a request to release the frequency band.

The response receiving unit 670 receives a frequency band response (a frequency-band reservation response, a frequency-band use response, a frequency-band changing response, or a frequency-band releasing response) returned from the QoS management device 51 or 52 in response to the frequency band request transmitted from the frequency-band request unit 660. As described above, this response contains information indicating results of the frequency-band reservation process, results of the frequency-band use process, results of the frequency-band changing process, or results of the frequency-band releasing process.

In the case where the results of the frequency-band reservation process indicate that the frequency band can be secured, or the user accepts the QoS policy in the confirmation process for the user terminal 21 by the confirmation unit 640, the response receiving unit 670 makes an order for the frequency-band request unit 660 to transmit the frequency-band use request to the QoS management device 51 or 52. Further, the response receiving unit 670 makes an order to transmit the request to change frequency bands to the QoS management device 51 or 52.

The confirmation unit 640 transmits a confirmation request containing the quality determining information acquired by the information identifying unit 630 to the user terminal serving as the transmission source of the service request. Further, in the case where the information identifying unit 630 does not acquire the quality determining information corresponding to the service request, the confirmation unit 640 transmits a request to set the quality determining information to the user terminal serving as the transmission source of the service request. The confirmation request and the setting request may contain a list of quality determining information that can be set or that can be changed. The list of the quality determining information contains character-string data such as "leaving determination of the quality level to the system," "desiring chargeable and high-quality services," and "desiring services with free-of-charge quality," and numerical data indicating each state.

In the mobile network 11, the confirmation request and the setting request for the service request from the user terminal 21 are transmitted through the Internet 90, the relaying device 31, and the mobile access network 71 to the user terminal 21. On the other hand, in the fixed network 12, the confirmation request and the setting request for the service request from the user terminal are transmitted through the Internet 90, the relaying device 32, the fixed access network 72, and the in-home relaying device 33 to the user terminal 22.

Further, in the case where the results of the frequency-band reservation process contained in the frequency-band reservation response received by the response receiving unit 670 indicate that the frequency band cannot be secured or that the QoS policy is changed, the confirmation unit 640 transmits, to the user terminal serving as the transmission source of the service request, the confirmation request containing information for the user to, for example, select to accept the change of the QoS service, or to cancel the service. In the case where the QoS policy is changed, this confirmation request may contain information on the changed QoS policy.

[Example of Operation]

Described below is the example of operations performed by the QoS management system 10 according to the first exemplary embodiment in each situation such as at the start of services, at the time of changing services, and at the end of services.

Figure 5:
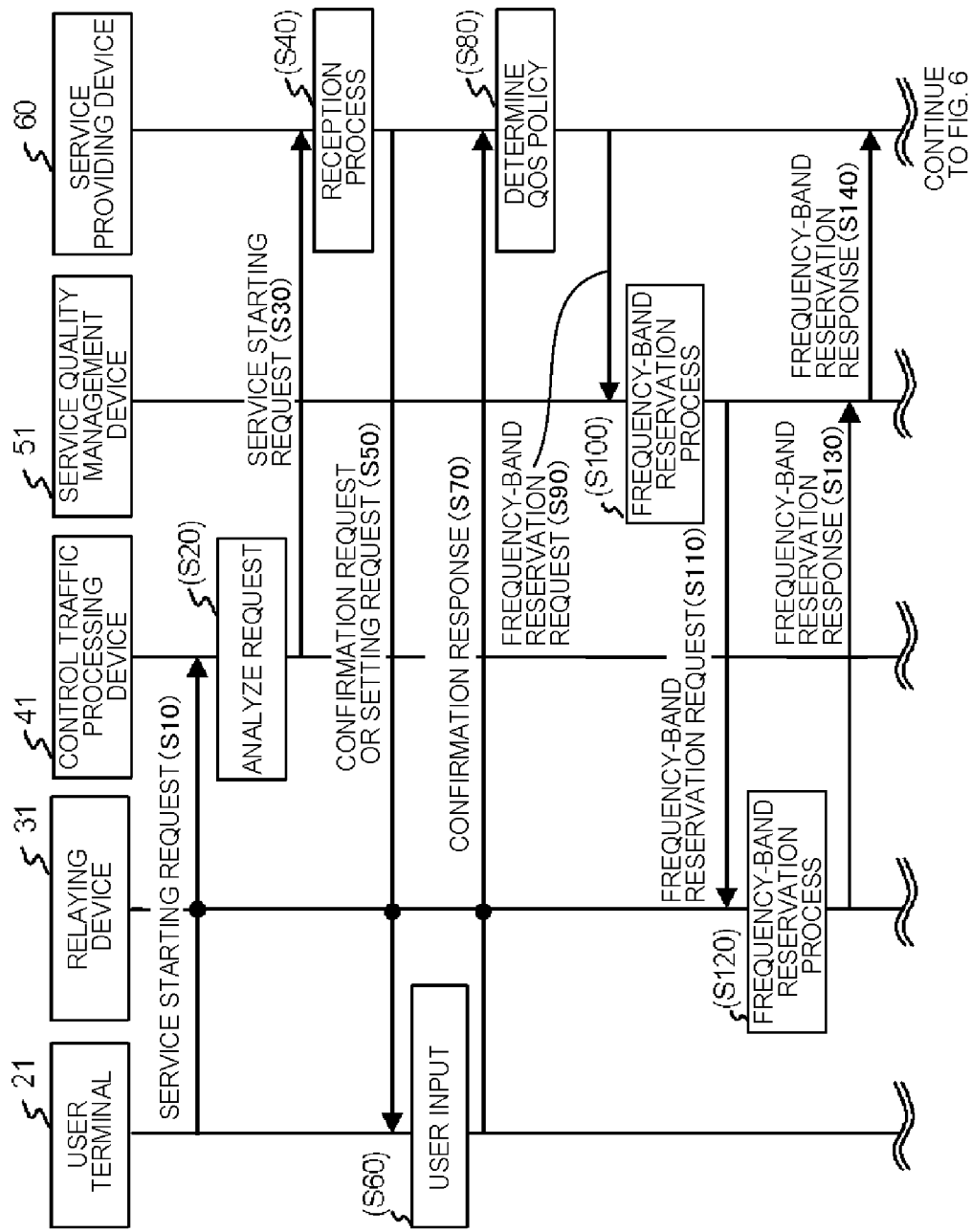
FIG. 5 is a sequence chart (first half) illustrating an example of operations performed by a QoS management system according to a first exemplary embodiment when a request to start a service is transmitted through a mobile network.
Figure 6:
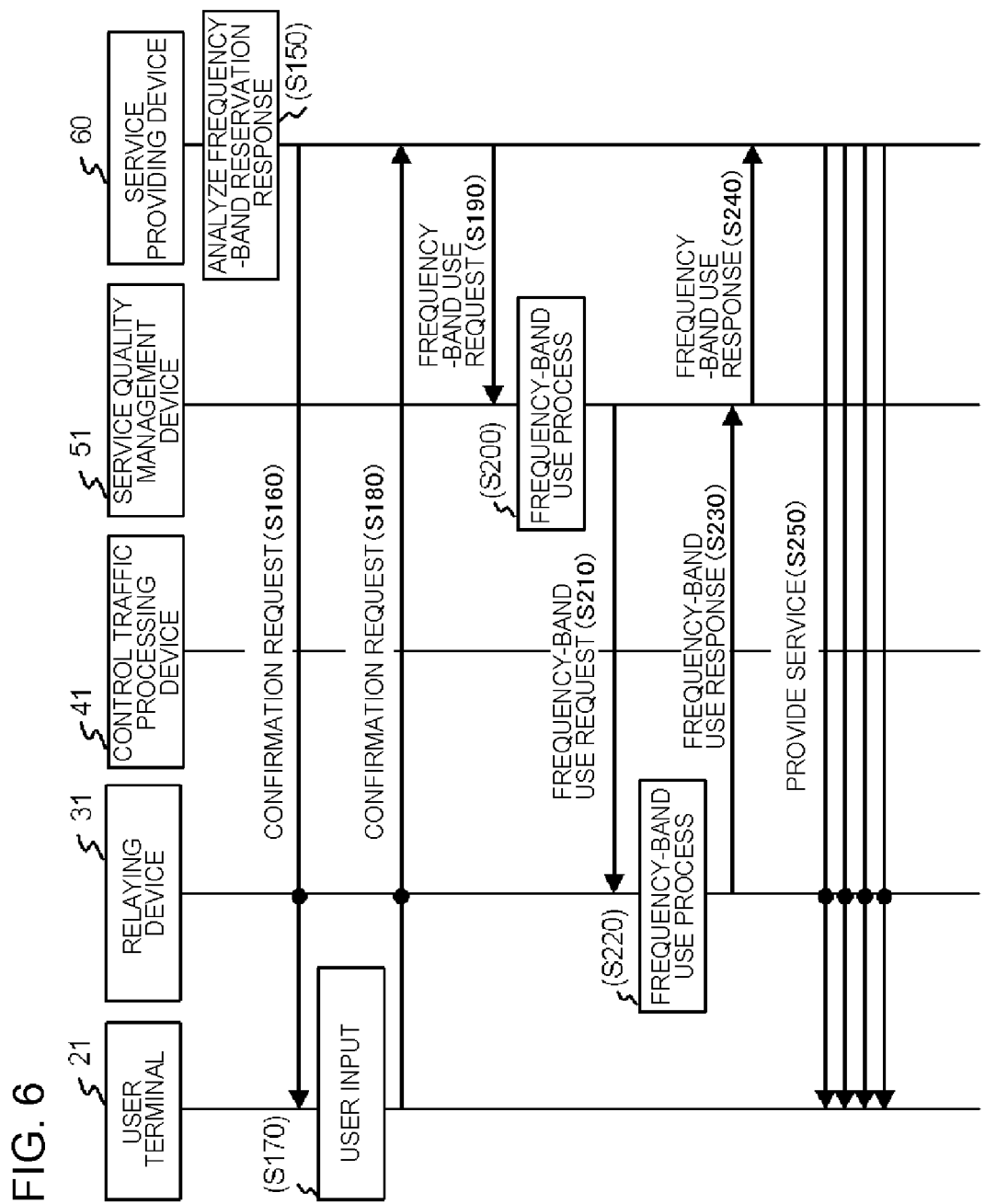
FIG. 6 is a sequence chart (second half) illustrating an example of operations performed by the QoS management system according to the first exemplary embodiment when the request to start a service is transmitted through the mobile network.

FIG. 5 and FIG. 6 are sequence charts each showing an example of operations performed by the QoS management system 10 according to the first exemplary embodiment when a request to start a service is transmitted through the mobile network 11. The user terminal 21 transmits the request to start a service (S10). This request to start a service is delivered to the control traffic processing device 41 through the mobile access network 71, the relaying device 31, and the mobile core network 81.

In the control traffic processing device 41, the receiving unit 410 receives the request to start a service. Then, the information adding unit 420 and the transmitting unit 430 analyze the received request to start a service (S20). In this analysis, the information adding unit 420 acquires device identification information for identifying a QoS management device 51 contained in the communication network (mobile network 11), which is the same as the communication network to which the control traffic processing device 41 belongs, and generates the request to start a service having the acquired device identification information added thereto on the basis of the received request to start a service.

Then, the transmitting unit 430 identifies the service providing device 60 corresponding to the user terminal number and the service information contained in the received request to start a service as a transmission destination, and transmits, to the identified service providing device 60, the request to start a service having the device identification information added thereto (S30). Note that it may be possible to employ a configuration in which the transmitting unit 430 performs user access authentication on the basis of the user terminal number and the user authentication information contained in the received request to start a service, and transmits the request to start a service to the service providing device 60 only if access is permitted.

In the service providing device 60, the request receiving unit 610 receives the request to start a service. Then, the information identifying unit 630 and the extracting unit 650 perform a reception process for the request to start a service (S40). In this reception process, the information identifying unit 630 acquires quality determining information corresponding to the request to start a service received by the request receiving unit 610 from the information retaining unit 620. Further, the extracting unit 650 extracts device identification information for identifying the QoS management device 51 from the request to start a service.

In the case where the information retaining unit 620 retains the quality determining information as the subscriber contract information, the information identifying unit 630 may perform, for example, the following processes. The information identifying unit 630 extracts the subscriber contract information from the information retaining unit 620 on the basis of the user terminal number contained in the received request to start a service, and checks the extracted subscriber contract information against the service information or service media information contained in the request to start a service. The information identifying unit 630 determines on the basis of the checking results whether to accept the request to start a service. If it is determined that the request is acceptable, the information identifying unit 630 acquires the quality determining information from the subscriber contract information.

Then, the confirmation unit 640 transmits a confirmation request containing the quality determining information acquired by the information identifying unit 630 to the user terminal 21 serving as the transmission source of the request to start a service (S50). If the information identifying unit 630 does not acquire the quality determining information corresponding to the request to start a service, the confirmation unit 640 transmits a request to set the quality determining information to the user terminal 21 (S50). The IP information for medium on the user terminal 21 contained in the request to start a service is used to determine a transmission destination of the confirmation request and the setting request. The IP information for medium represents, for example, information on the IP used for transmitting media contents (user plane) and port numbers. In addition to the IP information on the transmission destination and the quality determining information, each message of the confirmation request and the setting request may contain IP information for medium of the service providing device 60 and service medium information contained in the request to start a service.

Upon receiving this confirmation request, the user terminal 21 displays the quality determining information contained in the confirmation request for the user to select whether to change this quality determining information (S60). Note that this user interface is not limited to the screen display, and it may be possible to employ a voice output. Further, in the case where a change of the quality determining information is selected, the user terminal 21 causes the user to input details of the change (S60). The change of the quality determining information may be made, for example, by changing information from indicating that determination is left to the system to information indicating that the chargeable and high-quality service is desired, or by setting the quality level.

In the case where the setting request is received, the user terminal 21 displays the list of the quality determining information that can be set and is contained in the setting request so as to make the user select the quality determining information (S60).

In response to the input from the user, the user terminal 21 returns a confirmation response to the service providing device 60 (S70). This confirmation response contains the IP information for the medium on the user terminal 21, the service media information, and the quality determining information inputted (selected) by the user. The IP information for the medium on the service providing device 60 contained in the confirmation request is used to determine the destination of the confirmation response.

In the service providing device 60, the confirmation unit 640 receives the confirmation response. Then, the frequency-band request unit 660 determines the most appropriate QoS policy for the media contents required by the request to start a service on the basis of the quality determining information contained in the confirmation response, the service information contained in the request to start a service, and the service media information (S80). The frequency-band request unit 660 transmits a request to reserve a frequency band containing the determined QoS policy to the QoS management device 51 determined on the basis of the device identification information extracted by the extracting unit 650 (S90).

For example, the IP information on the QoS management device 51 serving as the transmission destination of the request to reserve the frequency band may be acquired by a domain name system (DNS) server (not illustrated) on the basis of the device identification information such as a network device name (including domain name) contained in the request to start a service. In addition to the IP information on the QoS management device 51 serving as the transmission destination, the message of the request to reserve the frequency band contains the IP information for control on the service providing device 60, the QoS policy information such as IP flow, QoS class, frequency band used, and media information, and the frequency band reserved.

In the QoS management device 51, the frequency-band request receiving unit 510 receives the request to reserve a frequency band. Then, the frequency-band control unit 520 performs the frequency-band reservation process corresponding to the request to reserve a frequency band (S100). More specifically, the frequency-band control unit 520 determines a relaying device 31 serving as the target for controlling a frequency band from among relaying devices managed and an IP interface in the relaying device 31 on the basis of the IP flow of the QoS policy contained in the received request to reserve a frequency band. Further, the frequency-band control unit 520 uses classes of the QoS policy contained in the frequency-band reservation request, the media information, and the frequency bandwidth used, to determine on the basis of the management information whether or not the frequency bandwidth used of the QoS policy can be secured in connection with the QoS class and the type of media used in the IP interface of the determined relaying device 31.

If it is determined that the frequency bandwidth can be secured, the frequency-band control unit 520 updates the management information with the QoS policy, and transmits the frequency-band reservation request to the relaying device 31 determined as the target for controlling the frequency band as described above (S110). In addition to the transmission-destination information and the transmission source information, the message of the frequency-band reservation request contains a QoS policy and a usage state (reserved) similar to those contained in S90.

If it is determined that the frequency bandwidth cannot be secured, the frequency-band control unit 520 returns the frequency-band reservation response containing information indicating that the frequency band cannot be secured as a result of the frequency-band reservation process to the service providing device 60 (not illustrated). It may be possible to employ a configuration in which, if it is determined that the frequency band cannot be secured, the frequency-band control unit 520 changes the QoS policy requested in the frequency-band reservation request from the service providing device 60, and the frequency-band reservation process is performed again with the changed QoS policy (not illustrated).

Upon receiving the frequency-band reservation request, the relaying device 31 performs the frequency-band reservation process for the IP interface belonging to this relaying device 31 and identified by the IP flow of the QoS policy contained in the frequency-band reservation request (S120). As with the frequency-band control unit 520 described above, the relaying device 31 determines whether or not the frequency bandwidth used of the QoS policy can be secured for the target IP interface. If it is determined that the frequency bandwidth used can be secured, the relaying device 31 adds a dynamical value of increase/decrease of the frequency bandwidth used that is managed by this relaying device 31 itself in response to a request, and sets the state of reservation of the frequency band to be a reserved state.

The relaying device 31 returns, to the QoS management device 51, the frequency-band reservation response containing information indicating the results of the frequency-band reservation process described above (S130). For example, information indicating that the frequency band can be secured as requested or indicating that the frequency band cannot be secured is set as the result of the frequency-band reservation process.

In the QoS management device 51, the frequency-band control unit 520 receives the frequency-band reservation response from the relaying device 31. The frequency-band control unit 520 returns, to the service providing device 60, a frequency-band reservation response containing the results of the frequency-band reservation process performed by the relaying device 31 and contained in the frequency-band reservation response from the relaying device 31, and the results of the frequency-band reservation process performed in S100 by the QoS management device 51 itself (S140). At this time, it may be possible to employ a configuration in which, if the results of the frequency-band reservation process performed by the relaying device 31 and the results of the frequency-band reservation process performed by the QoS management device itself indicate that the frequency band can be successfully secured, the frequency-band reservation response contains only the results of one frequency-band reservation process.

Further, at this time, if the frequency-band reservation process is performed on the basis of the changed QoS policy, the frequency-band control unit 520 sets, in the frequency-band reservation response, information indicating that the QoS policy is changed as a result of the frequency-band reservation process, and also sets the changed QoS policy.

In the service providing device 60, the response receiving unit 670 receives the frequency-band reservation response from the QoS management device 51. Then, as illustrated in FIG. 6, the confirmation unit 640 analyzes the frequency-band reservation response received by the response receiving unit 670 (S150). More specifically, the confirmation unit 640 judges whether or not the results of the frequency-band reservation process contained in the frequency-band reservation response indicate that the frequency band cannot be secured or that the QoS policy is changed.

If the information indicates that the frequency band cannot be secured or that the QoS policy is changed, the confirmation unit 640 transmits a confirmation request containing confirmation information for the user to select to accept the change of QoS policy or to cancel the service, to the user terminal 21 serving as the transmission source of the service request (S150). In this step, the transmitted confirmation request contains information similar to the confirmation request transmitted in S50 except that the above-described confirmation information is contained in place of the quality determining information.

Upon receiving the confirmation request, the user terminal 21 displays the confirmation information contained in the confirmation request to cause the user to select to accept the change of the QoS policy or to cancel the service (S170). The user interface is not limited to the screen display described above, and voice output may be possible. Further, if the change of quality level is selected, it may be possible for the user terminal 21 to cause the user to input details of the change.

The user terminal 21 returns the confirmation response containing the confirmation response information inputted (selected) by the user to the service providing device 60 (S180). The confirmation response information contains any one of accepting the change of the QoS policy, cancelling the service, and the changed quality level, each of which is inputted by the user. Further, the confirmation response transmitted in this step contains information similar to the confirmation response transmitted in S70 except that the confirmation response information is contained in place of the quality determining information.

In the service providing device 60, the confirmation unit 640 receives the confirmation response. In the case where the confirmation response information contained in the received confirmation response indicates that the user accepts the QoS policy, or in the case where the frequency band can be secured as a result of the frequency-band reservation process performed in the analysis of the frequency-band reservation response in S150, the frequency-band request unit 660 transmits the frequency-band use request to the QoS management device 51 (S190). This frequency-band use request is a message that makes a request to change the frequency band reserved through the above-described frequency-band reservation request (S90) by the QoS management device 51 and the relaying device 31 to the in-use state. The message of the frequency-band use request contains the IP information for control on the service providing device 60, the IP information on the QoS management device 51, the QoS policy confirmed by the user, and the state of use (in-use).

Here, in the case where the confirmation response information indicates cancellation of the service, the frequency-band request unit 660 notifies the user terminal 21 through the control traffic processing device 41 of termination of the service (not illustrated). Further, in the case where the confirmation response information indicates that the change of the QoS policy is not accepted, or in the case where the confirmation response information contains the changed quality level, the frequency-band request unit 660 makes the request to reserve frequency band again on the basis of the changed QoS policy (S90 to S140).

In the QoS management device 51, the frequency-band request receiving unit 510 receives the frequency-band use request. Then, the frequency-band control unit 520 performs the frequency-band use process (S200). More specifically, the frequency-band control unit 520 changes the state of use of the frequency band reserved in the above-described frequency-band reservation process (S100) to the in-use state. Then, the frequency-band control unit 520 transmits the frequency-band use request containing a similar QoS policy, to the relaying device 31 determined to be the target for controlling a frequency band (S210).

Upon receiving the frequency-band use request, the relaying device 31 performs the frequency-band use process for the IP interface belonging to this relaying device itself and determined on the basis of the IP flow of the QoS policy contained in the frequency-band use request (S220). More specifically, the relaying device 31 changes the state of use of the frequency band reserved in the above-described frequency-band reservation process (S120) to the in-use state.

The relaying device 31 returns, to the QoS management device 51, a frequency-band use response containing information indicating the results of this frequency-band use process (S230). This frequency-band use response further contains the IP information for control on the service providing device 60, the IP information on the QoS management device 51, the QoS policy, and the state of use (in-use).

In the QoS management device 51, the frequency-band control unit 520 receives the frequency-band use response. Then, the frequency-band control unit 520 returns, to the service providing device 60, the frequency-band use response containing the results of the frequency-band use process performed by the relaying device 31 and contained in the frequency-band use response and the results of the frequency-band use process performed in S200 by the QoS management device 51 by itself (S240). At this time, it may be possible to employ a configuration in which, in the case where the results of the frequency-band use process performed by the relaying device 31 and the results of the frequency-band use process performed by the QoS management device 51 itself similarly indicate success, the frequency-band use response contains the results of only one frequency-band use process.

In the case where the results of the frequency-band use process contained in the received frequency-band use response indicate success, the service providing device 60 provides the user terminal 21 with the media contents determined, for example, on the basis of the service information required through the request to start the service and the service media information (S250). The traffic occurring between the user terminal 21 and the service providing device 60 for providing the media contents is transmitted through the Internet 90 or mobile access network 71 to the relaying device 31.

The relaying device 31 uses the frequency bandwidth of which usage state is set to the in-use state, to forward the traffic between the user terminal 21 and the service providing device 60. In this forwarding, the relaying device 31 performs general QoS control such as prioritizing control and frequency-band control in accordance with the QoS policy (for example, frequency bandwidth) set to be the in-use state. As the frequency-band control, for example, the relaying device 31 performs a function (shaping) of buffering the traffic received by the relaying device 31 between the user terminal 21 and the service providing device 60, and forwarding it while adjusting the output transmission rate with the upper limit thereof being the frequency bandwidth set to be the in-use state.

Figure 7:
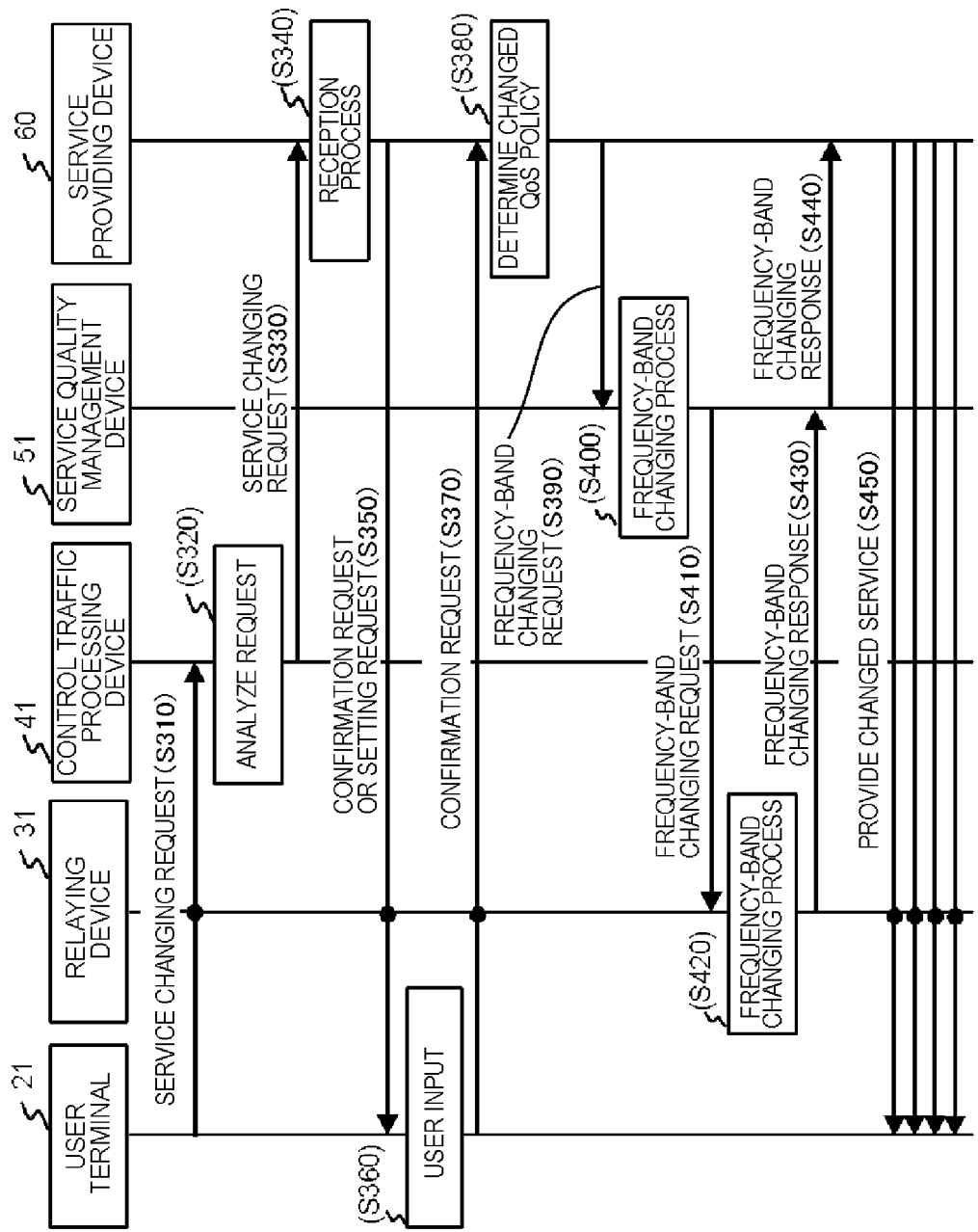
FIG. 7 is a sequence chart illustrating an example of operations performed by the QoS management system according to the first exemplary embodiment when a request to change services is transmitted through the mobile network.

FIG. 7 is a sequence chart illustrating an example of operations performed by the QoS management system 10 according to the first exemplary embodiment when a request to change services is transmitted through the mobile network 11. In the case where the viewing service of the media contents that have been already provided needs to be changed, the user terminal 21 transmits a request to change services (S310). This request to change services is delivered to the control traffic processing device 41 through the mobile access network 71, the relaying device 31, and the mobile core network 81. This request to change services contains, for example, the service information and the service media information after the change.

Processes in S320 to S440 after this concerning the request to change services are basically similar to those in S20 to S140 illustrated in FIG. 5. Next, a description will be made of the processes concerning the request to change services with focus being placed on differences from the processes concerning the request to start a service in FIG. 5.

The service starting requests S10 and S30 in FIG. 5 correspond to the service changing requests S310 and S330 described above. Determination of QoS policy (S80) in FIG. 5 corresponds to determination of changed QoS policy (S380). In S380, a QoS policy concerning the service after change is determined. Further, the frequency-band reservation requests S90 and S110 in FIG. 5 correspond to the frequency-band changing requests S390 and S410. The changed QoS policy is set in a message of each of the frequency-band changing requests.

The frequency-band reservation processes S100 and S120 in FIG. 5 correspond to the frequency-band changing process S400 and S420. Here, the frequency bandwidth used is changed into the frequency bandwidth corresponding to the QoS policy after change. The frequency-band reservation responses S130 and S140 in FIG. 5 correspond to frequency-band changing responses S430 and S440.

In the case where the results of the frequency-band changing process contained in the received frequency-band changing response indicate success, the service providing device 60 provides the user terminal 21 with the changed media contents determined on the basis of the service information and the service media information requested through the request to change services (S450).

Figure 8:
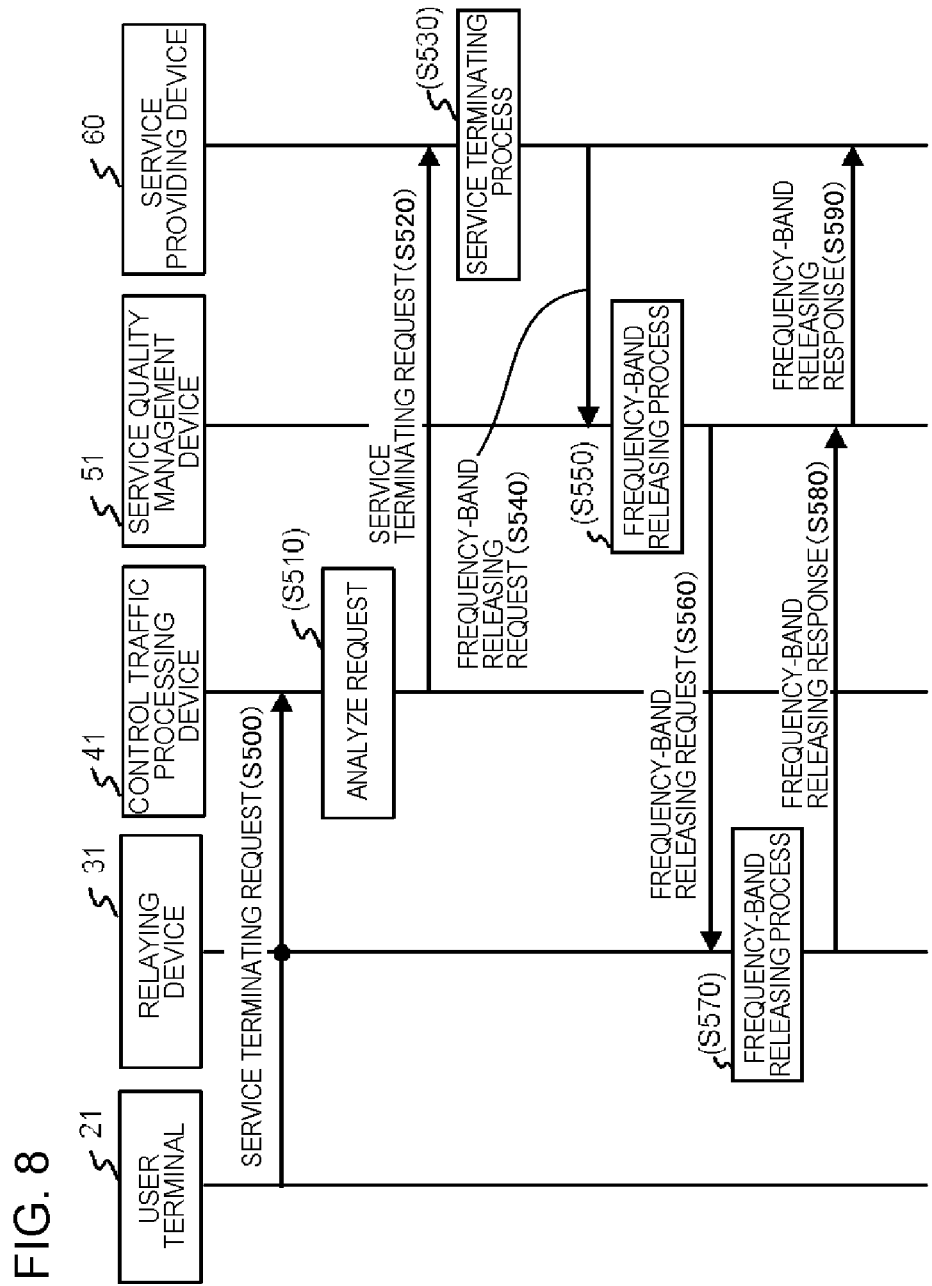
FIG. 8 is a sequence chart illustrating an example of operations performed by the QoS management system according to the first exemplary embodiment when a request to terminate the service is transmitted through the mobile network.

FIG. 8 is a sequence chart showing an example of operations performed by the QoS management system 10 according to the first exemplary embodiment when the request to terminate the service is transmitted through the mobile network 11. In the case where the service being provided needs to be terminated, the user terminal 21 transmits the request to terminate the service (S500). This service terminating request contains the service information and the service medium information on the target of the termination.

In the control traffic processing device 41, the receiving unit 410 receives the request to terminate the service. Then, the information adding unit 420 analyzes the received request to terminate the service (S510). Through this analysis, the information adding unit 420 generates a service terminating request having device identification information for identifying a QoS management device 51 added thereto on the basis of the received service terminating request, as with the case of service start and service termination. Then, the transmitting unit 430 transmits the service terminating request to the service providing device 60 that provides the service to be terminated (S520).

In the service providing device 60, the request receiving unit 610 receives the service terminating request, and terminates providing the media contents determined on the basis of the service information and the service media information contained in the message of the request (S530). Then, the frequency-band request unit 660 transmits, to the QoS management device 51, a frequency-band releasing request for releasing the frequency band used in connection with the terminated service (S540). The destination of the frequency-band releasing request is acquired from the device identification information added to the service terminating request.

In the QoS management device 51, the frequency-band request receiving unit 510 receives the frequency-band releasing request, and then, the frequency-band control unit 520 performs a frequency-band releasing process in accordance with the frequency-band releasing request (S550). More specifically, the frequency-band control unit 520 determines a relaying device 31 serving as the target of the frequency-band release from among relaying devices that are managed and an IP interface in the relaying device 31, on the basis of the IP flow of the QoS policy contained in the received frequency-band terminating request. Further, the frequency-band control unit 520 uses the class of the QoS policy contained in the frequency-band releasing request and the media information, thereby releasing the secured and used frequency bandwidth in connection with the QoS class and the type of media used in the IP interface of the determined relaying device 31. The frequency bandwidth used is released, for example, by changing the usage state of this frequency band in the management information from the in-use state into undetermined information. The frequency-band control unit 520 transmits the frequency-band releasing request to the relaying device 31 after updating the management information of the QoS management device 51 itself (S560).

After this, as with the QoS management device 51, the relaying device 31 performs the frequency-band releasing process (S570), and the frequency-band releasing response containing information indicating the results of the frequency-band releasing process is returned to the QoS management device 51 (S580). The QoS management device 51 receives the frequency-band releasing response from the relaying device 31, and returns, to the service providing device 60, the frequency-band releasing response in which the results of the frequency-band release performed by the relaying device 31 and the QoS management device 51 itself are reflected (S590).

Figure 9:
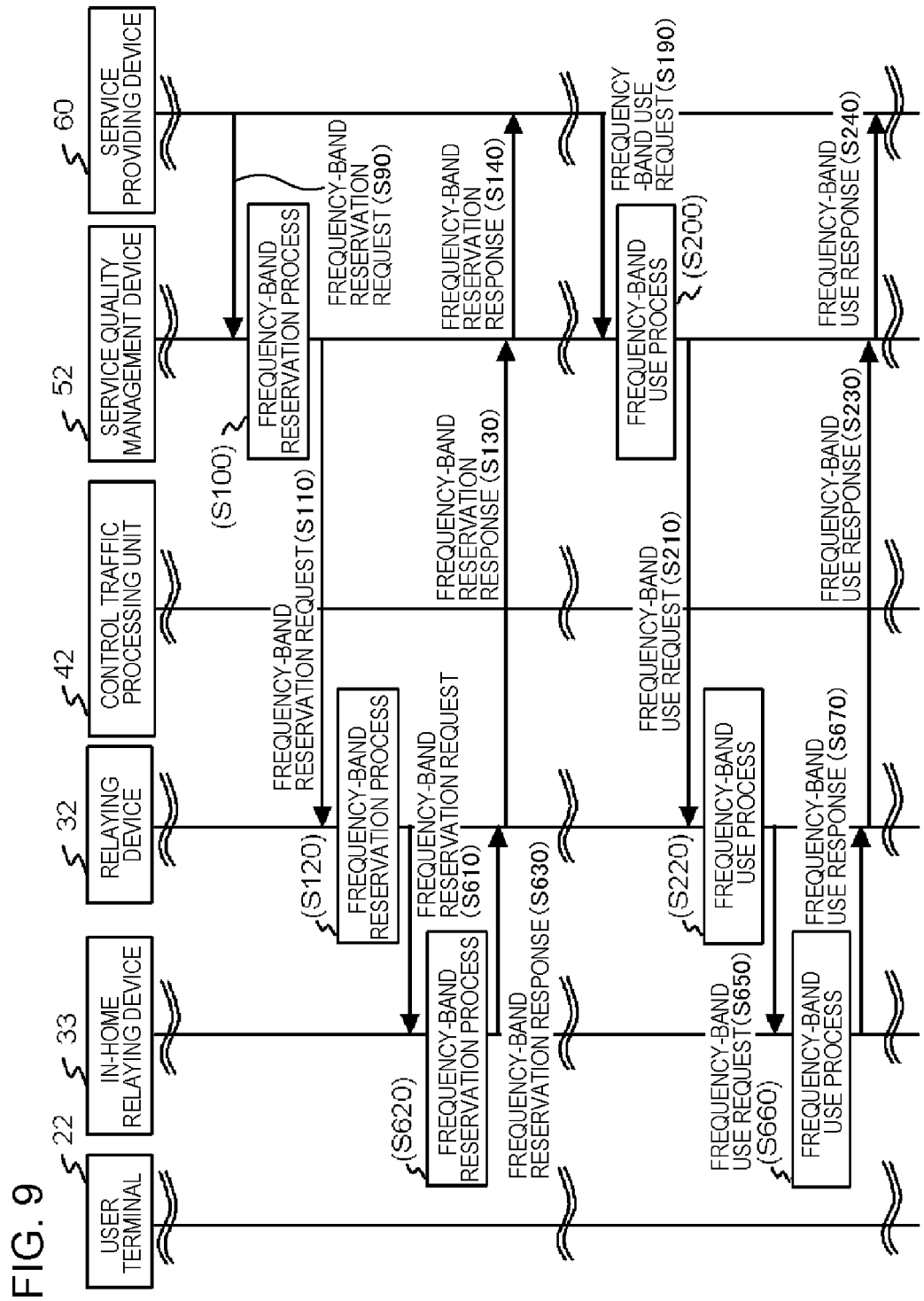
FIG. 9 is a sequence chart illustrating part of an example of operations performed by the QoS management system according to the first exemplary embodiment when a request to start a service is transmitted through a fixed network.

FIG. 9 is a sequence chart illustrating part of an example of operations performed by the QoS management system 10 according to the first exemplary embodiment when the request to start a service is transmitted through the fixed network 12. When the request to start a service is transmitted through the fixed network 12, the request to start a service transmitted from the user terminal 22 passes through the in-home relaying device 33, the fixed access network 72, the relaying device 32, and the fixed core network 82 to the control traffic processing device 42.

Thereafter, processes from S10 to S110 are performed in a similar manner to those in FIG. 5, except that transmission paths are different (omitted in FIG. 9). In the QoS management device 52 contained in the fixed network 12, the frequency-band control unit 520 manages the relaying device 32 included in the communication network (fixed network 12) to which the same QoS management device 52 belongs.

Upon receiving the frequency-band reservation request from the QoS management device 52, the relaying device 32 performs its frequency-band reservation process in a similar manner to the process S120 in FIG. 5. Before returning the frequency-band reservation response to the QoS management device 52 (S130), the relaying device 32 transmits the frequency-band reservation request to the in-home relaying device 33 that the same relaying device 32 manages (S610).

The relaying device 32 determines an in-home relaying device 33 serving as the target for controlling a frequency band on the basis of the IP flow of the QoS policy contained in the received frequency-band reservation request. The relaying device 32 retains in advance IP information on the in-home relaying device 33 under management, acquires IP information on the determined in-home relaying device 33 from among all the pieces of IP information retained, and sets the in-home relaying device 33 as the destination of the frequency-band reservation request. This frequency-band reservation request contains IP information on the relaying device 32, IP information on the in-home relaying device 33, the QoS policy, and the usage state (reserved).

Upon receiving the frequency-band reservation request from the relaying device 32, the in-home relaying device 33 performs a frequency-band reservation process similar to the frequency-band reservation process (S120) performed by the relaying device 32 (S620). The in-home relaying device 33 returns, to the relaying device 32, the frequency-band reservation response containing information indicating the results of the frequency-band reservation process (S630). For example, as the frequency-band reservation process results, information indicating that the frequency band can be secured as requested, or information indicating that the frequency band cannot be secured is set.

Upon receiving the frequency-band reservation response from the in-home relaying device 33, the relaying device 32 returns, to the QoS management device 52, the frequency-band reservation response containing information indicating the results of the frequency-band reservation processes performed by the in-home relaying device 33 and the relaying device 32 (S130). The QoS management device 52 returns the frequency-band reservation response to the service providing device 60 as in FIG. 5 (S140).

With these processes, the frequency-band reservation response received by the service providing device 60 contains results of the frequency-band reservation processes performed by the QoS management device 52, the relaying device 32, and the in-home relaying device 33. The service providing device 60 analyzes the frequency-band reservation response similar to that in FIG. 6 (S150, omitted in FIG. 9), and performs a confirmation process for the user (S160 to S180, omitted in FIG. 9).

Then, after the frequency-band use request is transmitted from the service providing device 60, processes S190 and S200 to S220 similar to those in FIG. 6 are performed.

Before the frequency-band use process (S220) completes and the frequency-band use response is transmitted to the QoS management device 52 (S230), the relaying device 32 transmits the frequency-band use request to the in-home relaying device 33 serving as the target for controlling a frequency band (S650). The in-home relaying device 33 performs a frequency-band use process (S660) similar to the frequency-band use process (S220) performed by the relaying device 32, and returns the frequency-band use response to the relaying device 32 (S670). The QoS management device 52 returns the frequency-band use response to the service providing device 60 in a similar manner to that in FIG. 6 (S240).

With these processes, the frequency-band use response received by the service providing device 60 contains the results of the frequency-band use processes performed by the QoS management device 52, the relaying device 32, and the in-home relaying device 33. If the results of the frequency-band use processes indicate normal, the service providing device 60 provides the target media contents to the user terminal 22 (similar to S250 in FIG. 6).

In the case where the service change and the service termination are requested through the fixed network 12, processes similar to the case where these are requested though the mobile network 11 are performed, except that the in-home relaying device 33 is included in the target for controlling the frequency band (see FIG. 7 and FIG. 8). At this time, the relaying device 32 transmits the request to change frequency bands and the frequency-band releasing request to the in-home relaying device 33, and receives the frequency-band changing response, and the frequency-band releasing response from the in-home relaying device 33.

[Operation and Effect of First Exemplary Embodiment]

As described above, in the first exemplary embodiment, the control traffic processing devices 41 and 42 receive the service requests (request to start a service, request to change services, and request to terminate the service) from the user terminals 21 and 22, and on the basis of the received service requests, generate service requests to which device identification information for identifying QoS management devices 51 and 52 belonging to the same communication network are added thereto. Then, the service requests having the device identification information added thereto are transmitted to the service providing device 60.

With this configuration, the service providing device 60 receiving the service requests can acquire, from messages of the received service requests, transmission destination of request messages for frequency-band control (for example, frequency band reservation, frequency band use, frequency band release, and frequency band change) in accordance with the received service requests. In other words, according to the first exemplary embodiment, information on the QoS management device 51 or 52 can be appropriately provided to the service providing device 60 even in the case where the mobile network 11 or fixed network 12 and the service providing device 60 are managed by different network operators, whereby it is possible to appropriately manage quality of the communication services.

Further, in the first exemplary embodiment, the information retaining unit 620 retains, for each user, quality determining information serving as information indicating user's will (desire) at the time of determining the quality of services. Then, when the service requests are received, quality determining information in accordance with the service requests is extracted from the information retaining unit 620, and a confirmation request containing the extracted quality determining information or a request for setting the quality determining information is transmitted to a user terminal 21 or 22 serving as a transmission source of the service requests. Then, a QoS policy is determined on the basis of details of the response returned from the user terminal 21 or 22 in response to the confirmation request or the setting request.

As described above, according to the first exemplary embodiment, there are provided procedures for checking user's will between the service providing device 60 and the user terminal 21 or 22, and the QoS policy is determined on the basis of the quality determining information for which user's will has been checked, whereby it is possible to achieve the quality of service appropriate for users in an end-to-end manner.

Further, in the first exemplary embodiment, the service providing device 60 receives information indicating the results of the frequency-band reservation process performed by the QoS management device 51 or 52, and the relaying device 31, 32 or 33 as the frequency-band reservation response. Then, in the case where the results of the frequency-band reservation process do not agree with the frequency-band reservation request, a confirmation request containing information for making a user select to accept the change of the QoS policy or to cancel the service is transferred to the user terminal serving as the transmission source of the service requests.

With this configuration, according to the first exemplary embodiment, the user is asked to check even if the frequency-band reservation process results in disagreeing with the request, whereby it is possible to achieve the appropriate quality of service with user's consent in an end-to-end manner.

[Second Exemplary Embodiment]

In the second exemplary embodiment, the QoS management system 10 provides a service that switches a user terminal receiving the media contents from a user terminal currently receiving the service into another user terminal while keeping the QoS policy. Hereinbelow, communication networks currently receiving media contents, and nodes and user terminals belonging to each of the communication networks are denoted as a currently receiving service, and communication networks serving as destination after switching, and nodes and user terminals belonging to each of the communication networks are denoted as a service forwarding destination.

In the second exemplary embodiment, the QoS management system 10 has a system configuration similar to that in the first exemplary embodiment illustrated in FIG. 1.

[Device Configuration]

After this, the process configuration of each node constituting the QoS management device 10 according to the second exemplary embodiment will be described with focus being placed on differences from that in the first exemplary embodiment while omitting details similar to those in the first exemplary embodiment as appropriate.

Figure 10:
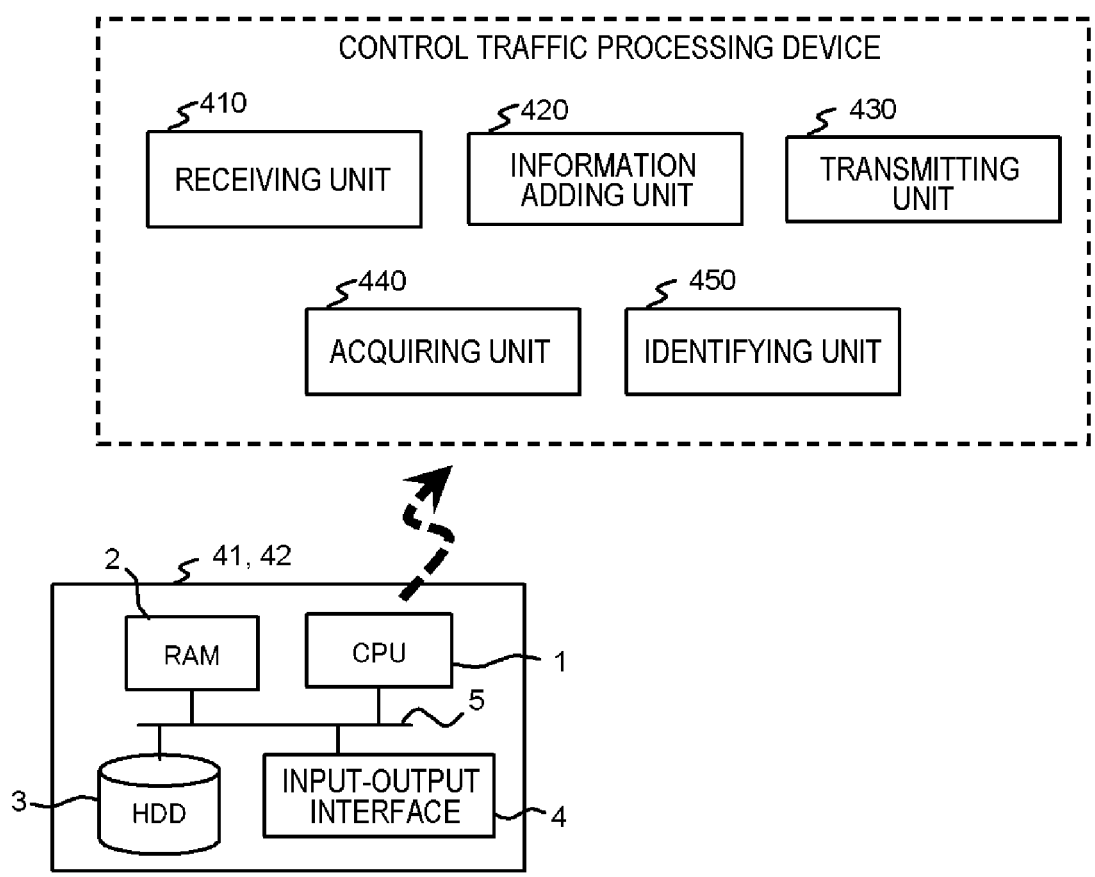
FIG. 10 is a schematic view illustrating an example of a process configuration of a control traffic processing device according to a second exemplary embodiment.

FIG. 10 is a schematic view illustrating an example of a process configuration of the control traffic processing devices 41 and 42 in the second exemplary embodiment. The control traffic processing devices 41 and 42 each further include an acquiring unit 440 and an identifying unit 450 in addition to the process configuration of the first exemplary embodiment. As in the first exemplary embodiment, these processing units are realized with the CPU 1 running a program stored in the memory.

In the case where a user terminal request to forward the currently communicating multimedia session from another user terminal to this user terminal itself, the user terminal transmits a service starting request containing information on a terminal currently receiving a service. This information on a terminal currently receiving a service is terminal identification information for identifying a user terminal that is currently receiving media contents through another communication network. For the terminal identification information, a user terminal number is used for example. In the case where one user wishes to switch a user terminal 21 currently providing the user with media contents into a user terminal 22 while viewing the media contents through the user terminal 21, the service starting request containing information on a terminal currently receiving a service, the information indicating the user terminal 21, is transmitted from the user terminal 22.

The acquiring unit 440 extracts the information on a terminal currently receiving a service from the service starting request received by the receiving unit 410.

The identifying unit 450 identifies a control traffic processing device belonging to another communication network that can communicate with a user terminal identified on the basis of the information on a terminal currently receiving a service acquired by the acquiring unit 440. For example, in the case where the user terminal 21 is currently receiving media contents through the mobile network 11 and the request to start a service is transmitted from the user terminal 22, the identifying unit 450 of the control traffic processing device 42 identifies a control traffic processing device 41 belonging to the mobile network 11.

For example, the identifying unit 450 retains, for each of the user terminals, information on control traffic processing devices that manage the user terminals, and acquires a control traffic processing device corresponding to the user terminal identified on the basis of information on a terminal currently receiving a service from the retained information. Further, the identifying unit 450 may fix and retain information on a control traffic processing device serving as a transmission destination in the case where the identifying unit 450 does not manage the user terminal identified on the basis of the information on a terminal currently receiving a service. Further, it may be possible to employ a configuration in which, in the case where the information on a terminal currently receiving a service has a domain name, the identifying unit 450 retains in advance information on the control traffic processing device corresponding to each domain, and the control traffic processing device is identified on the basis of the retained information.

As in the first exemplary embodiment, the transmitting unit 430 transmits the service starting request having the device identification information added thereto to the control traffic processing device identified by the identifying unit 450. At this time, a QoS management device identified on the basis of the device identification information added to the service starting request is a QoS management device belonging to a communication network serving as the service forwarding destination. Note that this exemplary embodiment does not limit a communication protocol between control traffic processing devices.

As in the first exemplary embodiment, the information adding unit 420 generates a service starting request containing the device identification information for identifying a QoS management device belonging to the same communication network. In the second exemplary embodiment, plural pieces of the device identification information may be added to the service starting request. This is because, in the second exemplary embodiment, as described above, the service starting request is forwarded by the transmitting unit 430 from a control traffic processing device serving as the service forwarding destination to a control traffic processing device that is currently receiving the service.

Thus, of the plural pieces of the device identification information added to the service starting request, device identification information indicating a QoS management device serving as a service forwarding destination is first set (ahead), and then, device identification information indicating a QoS management device that is currently receiving the service is set (backward). Hereinafter, of the plural pieces of device identification information added to the service starting request, the device identification information for identifying a QoS management device serving as the service forwarding destination is denoted by a forward device identification information or information on a forwarding destination device, and the device identification information for identifying a QoS management device that is currently receiving the service is denoted by a backward device identification information or information on a currently receiving device.

Figure 11:
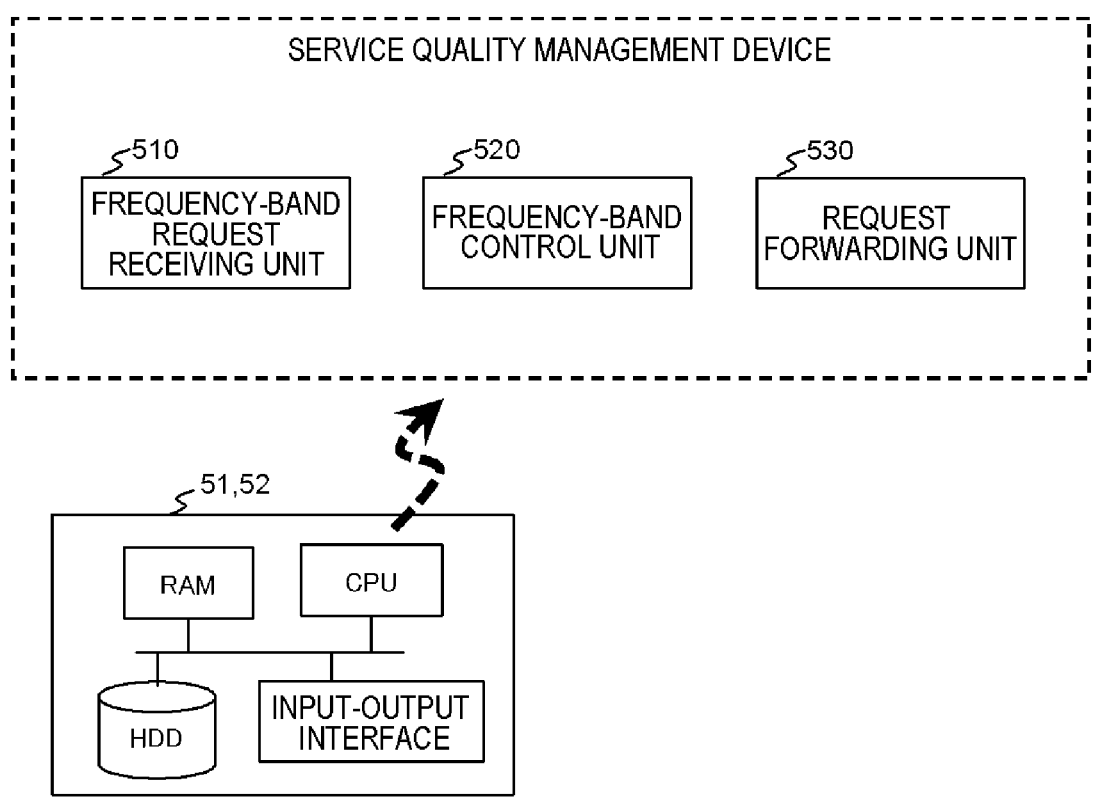
FIG. 11 is a schematic view illustrating an example of a process configuration of a quality of service (QoS) management device according to the second exemplary embodiment.

FIG. 11 is a schematic view illustrating an example of a process configuration of the QoS management devices 51 and 52 in the second exemplary embodiment. The QoS management devices 51 and 52 each further include a request forwarding unit 530 in addition to the process configuration of the first exemplary embodiment. This processing unit is also realized with the CPU 1 running a program stored in the memory as in the first exemplary embodiment.

In the case where the frequency-band reservation request or frequency-band use request received by the frequency-band request receiving unit 510 contains the information on a forward destination device described above, the request forwarding unit 530 forwards the frequency-band reservation request or frequency-band use request to the QoS management device identified on the basis of the information on a forwarding destination device.

[Example of Operation]

Described below is the example of operations performed by the QoS management system 10 according to the second exemplary embodiment with focus being placed on differences from that of the first exemplary embodiment. Further, in the following description, an example will be given in which, when media contents are being provided to the user terminal 22 through the fixed network 12 from the service providing device 60, the user terminal 21 makes a request to forward the multimedia session through the mobile network 11.

Figure 12:
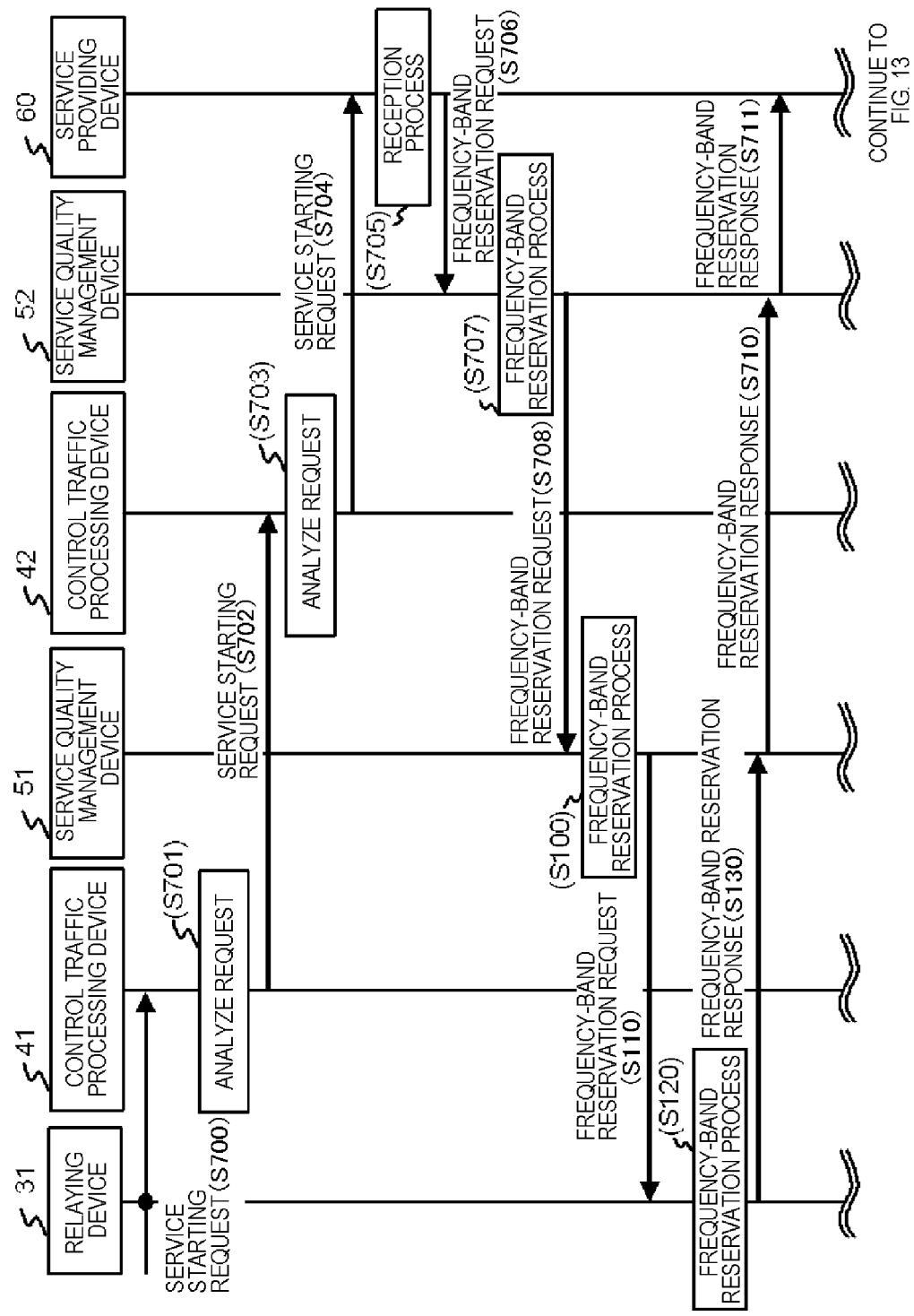
FIG. 12 is a sequence chart (first half) illustrating an example of operations performed by the QoS management system according to the second exemplary embodiment.
Figure 13:
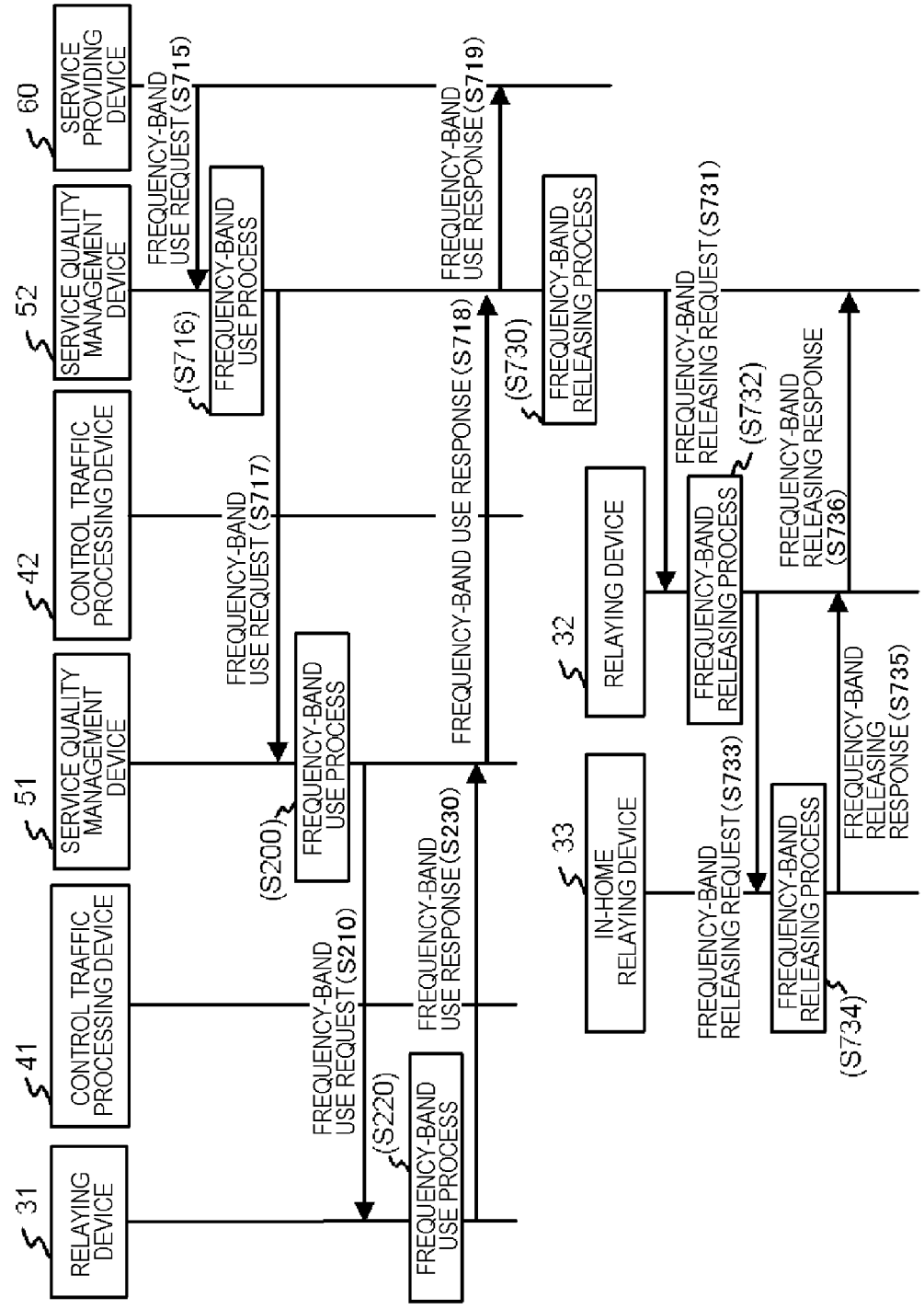
FIG. 13 is a sequence chart (second half) illustrating an example of operations performed by the QoS management system according to the second exemplary embodiment.

FIG. 12 and FIG. 13 are sequence charts each showing an example of operations performed by the QoS management system 10 according to the second exemplary embodiment. At this time, the user terminal 22 receives media contents from the service providing device 60 through the Internet 90, the relaying device 32, the fixed access network 72, and the in-home relaying device 33. The user terminal 21 serving as the service forwarding destination transmits a service starting request containing the information on a terminal currently receiving a service indicating the user terminal 22 (S700).

In the control traffic processing device 41, the receiving unit 410 receives the service starting request. Then, the information adding unit 420, the transmitting unit 430, and the acquiring unit 440 analyze the received service starting request (S701). In the analysis, the information adding unit 420 acquires the device identification information for identifying a QoS management device 51 belonging to the communication network (mobile network 11) same as the communication network to which the control traffic processing device 41 belongs, and generates a service starting request having the acquired device identification information added thereto as the information on a forwarding destination device.

Then, the acquiring unit 440 extracts the information on a terminal currently receiving a service from the service starting request. Further, the identifying unit 450 identifies a control traffic processing device 42 belonging to a communication network (fixed network 12) that can communicate with the user terminal 22 identified on the basis of the information on a terminal currently receiving a service acquired by the acquiring unit 440.

Then, the transmitting unit 430 transmits the service starting request having the information on a forwarding destination device indicating the QoS management device 51 added thereto to the control traffic processing device 42 identified by the identifying unit 450 (S702). Note that, as in the first exemplary embodiment, the transmitting unit 430 may perform user access authentication on the basis of the user terminal number or the user authentication information contained in the service starting request. In addition to the information on a forwarding destination device (information for identifying the QoS management device 51), the service starting request transmitted includes, for example, service information, IP information for the medium on the user terminal 21, a type of request (starting), the user terminal number of the user terminal 21, the service media information, IP information on the control traffic processing device 41, IP information on the control traffic processing device 42, and information on a terminal currently receiving a service (user terminal number of the user terminal 22).

In the control traffic processing device 42, the receiving unit 410 receives the service starting request transmitted from the control traffic processing device 41. Then, the information adding unit 420, the transmitting unit 430, and the acquiring unit 440 analyze the received service starting request (S703). In the analysis, the information adding unit 420 acquires device identification information for identifying a QoS management device 52 belonging to the communication network (fixed network 12) as the communication network to which the control traffic processing device 42 belongs, adds the acquired device identification information as the information on a currently receiving device, and generates a service starting request having the information on a forwarding destination device contained in the received service starting request added thereto.

Then, the transmitting unit 430 determines the transmission destination of the service starting request having the information on a forwarding destination device and the information on a currently receiving device added thereto to be the service providing device 60, and transmits the service starting request to the determined service providing device 60 (S704). In addition to the information on a forwarding destination device (information for identifying the QoS management device 51) and the information on a currently receiving device (information for identifying the QoS management device 52), the service starting request transmitted includes, for example, the service information, IP information for the medium on the user terminal 21, a type of request (starting), the user terminal number of the user terminal 21, service media information, IP information on the control traffic processing device 42, IP information for control on the service providing device 60, and the information on a terminal currently receiving a service (user terminal number of the user terminal 22).

Further, when determining the transmission destination of the service starting request, the transmitting unit 430 may refer to the following details of determination made by the identifying unit 450. The identifying unit 450 does not determine other control traffic processing devices as the transmission destination because the control traffic processing device corresponding to the user terminal 22 identified on the basis of the information on a terminal currently receiving a service acquired by the acquiring unit 440 is a control traffic processing device to which the identifying unit 450 itself belongs. Further, it may be possible to employ a configuration in which, at this time, in the case where the user access authentication has been already performed by the control traffic processing device 41, the transmitting unit 430 does not perform the user access authentication.

In the service providing device 60, the request receiving unit 610 receives the service starting request. Then, the information identifying unit 630 and the extracting unit 650 each perform a reception process for the service starting request (S705). In the reception process, the extracting unit 650 extracts the backward device identification information (information on a currently receiving device) from the service starting request. Here, the service starting request contains an instruction to forward the service. Further, the QoS policy applied to the currently provided service is maintained. Thus, as illustrated in FIG. 12, the confirmation processes (processes from S50 to S70 in FIG. 5) for the quality determining information, which are described in the first exemplary embodiment and are performed by the information identifying unit 630 and the confirmation unit 640, may not be performed. Here, the extracting unit 650 retains the information on a terminal currently receiving a service contained in the service starting request.

Then, the frequency-band request unit 660 determines the optimum QoS policy for the media contents required through the service starting request to be the QoS policy applied to the service currently provided. The frequency-band request unit 660 transmits a frequency-band reservation request containing the determined QoS policy to the QoS management device 52 identified on the basis of the information on a currently receiving device extracted by the extracting unit 650 (S706). In addition to the IP information on the QoS management device 52 serving as the destination, this frequency-band reservation request includes, for example, IP information for control on the service providing device 60, the QoS policy (IP flow, QoS class, frequency bandwidth used, media information), usage state (reserved), forward device identification information (information on a forwarding destination device=information for identifying the QoS management device 51), and information on a terminal currently receiving a service (user terminal number of the user terminal 22).

In the QoS management device 52, the frequency-band request receiving unit 510 receives the frequency-band reservation request. Then, the request forwarding unit 530 performs the frequency-band reservation process (S707). If detecting that the frequency-band reservation request contains the information on a forwarding destination device, the request forwarding unit 530 transmits a frequency-band reservation request to the QoS management device 51 serving as the destination and identified on the basis of the information on a forwarding destination device (S708). The IP information on the QoS management device 51 serving as the destination is acquired, for example, from the DNS server on the basis of the information on a forwarding destination device. In addition to the IP information on the QoS management device 51 serving as the destination and the IP information on the QoS management device 52 serving as the transmission source, this frequency-band reservation request contains, for example, the QoS policy and the usage state (reserved).

In the QoS management device 51, the frequency-band request receiving unit 510 receives the frequency-band reservation request transmitted from the QoS management device 52. After this, processes from S100 to S130 are performed in a similar manner to those in the first exemplary embodiment (see FIG. 5). More specifically, in response to the frequency-band reservation request, the frequency-band reservation processes are performed in the QoS management device 51 and the relaying device 31.

The frequency-band control unit 520 of the QoS management device 51 receives the frequency-band reservation response from the relaying device 31. The frequency-band control unit 520 transmits, to the QoS management device 52, a frequency-band reservation response containing the results of the frequency-band reservation process performed by the relaying device 31 and contained in the received frequency-band reservation response and the results of the frequency-band reservation process performed in S100 by the QoS management device 51 (S710). The destination of the frequency-band reservation response can be acquired on the basis of the IP information on the transmission source of the frequency-band reservation request that has been already received.

In the QoS management device 52, the request forwarding unit 530 receives the frequency-band reservation response transmitted from the QoS management device 51. The request forwarding unit 530 forwards the frequency-band reservation response to the service providing device 60 (S711).

In the service providing device 60, the response receiving unit 670 receives the frequency-band reservation response from the QoS management device 52. This frequency-band reservation response contains the results of the frequency-band reservation process performed by the relaying device 31 and the results of the frequency-band reservation process performed by the QoS management device 51 as described above. After this, the confirmation unit 640 analyzes the frequency-band reservation response in a similar manner to the analysis made in the first exemplary embodiment, and performs a confirmation process in the case where the results of the frequency-band reservation process indicate that the frequency band cannot be secured or that the QoS policy is changed (processes from S150 to S180 illustrated in FIG. 6).

Then, the frequency-band request unit 660 transmits the frequency-band use request for the frequency band reserved as described above. The frequency-band use request is transmitted through the QoS management device 52 currently receiving the service to the QoS management device 51 serving as the service forwarding destination (S715, S716, S717), through similar processes to those for the frequency-band reservation request as described above. The information contained in the frequency-band use request is similar to the information contained in the frequency-band reservation request transmitted in S706, except that the usage state indicates the in-use state. In response to the received frequency-band use request, the QoS management device 51 and the relaying device 31 perform processes similar to those in the first exemplary embodiment (processes from S200 to S230).

The QoS management device 51 transmits the frequency-band use response to the QoS management device 52 through processes similar to processes performed when the frequency-band reservation response is received (S718). This frequency-band use response contains the results of the frequency-band use process performed by the relaying device 31 and the results of the frequency-band user process performed by the QoS management device 51. The QoS management device 52 forwards this frequency-band use response to the service providing device 60 through processes similar to processes performed for the frequency-band reservation response (S719).

In the case where the results of the frequency-band use process contained in the received frequency-band use response indicate success, the service providing device 60 changes, to the user terminal 21, the destination of provision of the media contents that the user terminal 22 is currently receiving. With these processes, the media contents are transmitted to the user terminal 21 through the Internet 90, the relaying device 31, and the mobile access network 71 from the service providing device 60.

After transmitting the frequency-band use response to the service providing device 60, the QoS management device 52 performs the frequency-band releasing process on the basis of the information on a terminal currently receiving a service contained in the frequency-band use request previously received in S715 (S730). More specifically, the frequency-band control unit 520 acquires the QoS policy used for the user terminal 22 identified on the basis of the information on a terminal currently receiving a service, and performs the frequency-band releasing process for this QoS policy. This frequency-band releasing process is similar to that in the first exemplary embodiment (see S550 in FIG. 8).

After this, the frequency-band control unit 520 transmits the frequency-band releasing request to the relaying device 32 serving as the target (S731), and the relaying device 32 performs the frequency-band releasing process (S732). These processes are similar to those in the first exemplary embodiment (S560 and S570 in FIG. 8). The relaying device 32 in the fixed network 12 manages the in-home relaying device 33. Thus, the relaying device 32 performs its frequency-band releasing process, and then, transmits the frequency-band releasing request to the in-home relaying device 33 serving as the target (S733). Similarly, the in-home relaying device 33 performs the frequency-band releasing process (S734), and returns the frequency-band releasing response indicating the results of the frequency-band releasing process to the relaying device 32 (S735). The relaying device 32 returns the frequency-band releasing response to the QoS management device 52 in a similar manner (S736).

[Operation and Effect of Second Exemplary Embodiment]

As described above, in the second exemplary embodiment, the control traffic processing device serving as the service forwarding destination extracts the information on a terminal currently receiving a service from the service starting request transmitted from the user terminal, and transmits the service starting request to another control traffic processing device (the control traffic processing device that is currently receiving a service) corresponding to the user terminal identified on the basis of the information on a terminal currently receiving a service. At this time, the control traffic processing device serving as the service forwarding destination generates a service starting request having information (information on a forwarding destination device) on the QoS management device serving as the service forwarding destination.

With these processes, according to the second exemplary embodiment, even in the case where services are relayed over plural communication networks having different management forms such as FMC, it is possible to notify a communication network currently receiving the service of information on the QoS management device belonging to a communication network serving as the service forwarding destination.

Further, in the second exemplary embodiment, when a control traffic processing device currently receiving a service receives a service starting request transmitted from a control traffic processing device serving as a service forwarding destination, a service starting request having information on a forwarding destination device contained in the service starting request as well as information (information on a currently receiving device) on a QoS management device currently receiving the service added thereto is transmitted to the service providing device 60.

With these processes, according to the second exemplary embodiment, even in the case where each communication network and the service providing device 60 are different in the management form, it is possible to provide the service providing device 60 with information on the QoS management device of each of the communication networks.

Further, in the second exemplary embodiment, in the service providing device 60, information on a forwarding destination device and information on a currently receiving device are extracted from the received service starting request, and a frequency-band request containing the extracted information on a forwarding destination device is transmitted to the QoS management device identified on the basis of the extracted information on a currently receiving device. At this time, in the frequency band request, the QoS policy applied to the currently receiving service is relayed. In the case where the received frequency band request contains the information on a forwarding destination device, the QoS management device that receives the frequency band request transmits the frequency band request of which destination is set to the QoS management device identified on the basis of the information on a forwarding destination device. With these processes, it is possible to secure the frequency band for a QoS management device serving as the service forwarding destination and the relaying device managed by the QoS management device.

With these processes, according to the second exemplary embodiment, even in the case where the service forwarding destination belongs to a communication network having a management form different from that of the communication network currently receiving a service, it is possible to appropriately secure, in the communication network serving as the service forwarding destination, the frequency-band corresponding to the QoS policy that is the same as that before forwarding. Thus, it is possible to appropriately achieve the QoS control of services over different network operators' networks such as the FMC in an end-to-end manner.

[First Modification Example]

In the above-described exemplary embodiment, an example has been given in which the mobile network 11 and the fixed network 12 are configured so as to be able to communicate with the service providing device 60 only through a public network without passing through other specific communication networks. However, this embodiment may be configured such that the mobile network 11 and the fixed network 12 communicate with the service providing device 60 through the public network as well as other specific communication networks.

Figure 14:
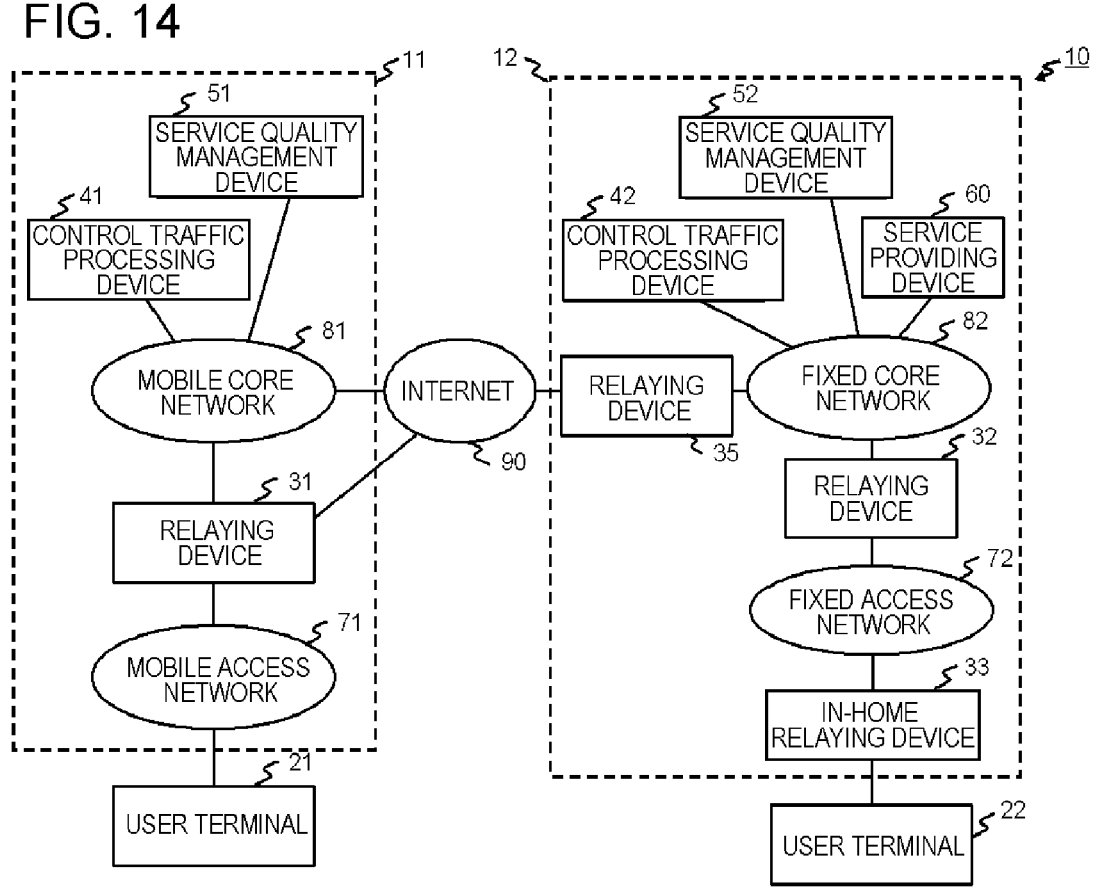
FIG. 14 is a schematic view illustrating an example of a configuration of a QoS management system according to a first modification example.

FIG. 14 is a schematic view illustrating an example of a configuration of the QoS management system 10 according to a first modification example. As illustrated in FIG. 14, in the first modification example, an example is given in which the service providing device 60 belongs to the fixed network 12.

Note that, as another example, the service providing device 60 may belong to the mobile network 11. According to the example of the configuration in FIG. 14, the mobile network 11 communicates with the service providing device 60 through the Internet 90 and the fixed network 12.

In the first modification example, the fixed network 12 further includes a relaying device 35 in addition to the configuration in the previously described exemplary embodiments. The relaying device 35 relays traffic transmitted/received between the fixed core network 82 and the Internet 90, and controls the communication frequency band between them. The QoS management device 52 manages the relaying device 35 as well as the relaying device 32. Described below are the nodes in the first modification example with focus being placed on details different from the first exemplary embodiment and the second exemplary embodiment.

In the first modification example, in the case where the service starting request is transmitted from the user terminal 21 through the mobile network 11, a process sequence similar to that illustrated in FIG. 12 and FIG. 13 in the second exemplary embodiment is performed. However, in this case, the service starting request transmitted from the user terminal 21 does not contain the information on a terminal currently receiving a service. Note that, in the case where the service starting request is transmitted from the user terminal 22 through the fixed network 12, processes similar to those in the previously described exemplary embodiments are performed.

In the first modification example, the determination method at the time of transmitting the service starting request from the control traffic processing device 41 to the control traffic processing device 42 is different from processes illustrated in FIG. 12. More specifically, the control traffic processing device 41 determines a service providing device 60 on the basis of the received service starting request, and then, determines a control traffic processing device belonging to a communication network through which passage is necessary to access the service providing device 60. In the example illustrated in FIG. 14, the control traffic processing device 42 is determined. With this configuration, the control traffic processing device 41 transmits the service starting request containing device identification information on the QoS management device 51 to the control traffic processing device 42 in a similar manner to FIG. 12.

Further, in the first modification example, the QoS management device 52 that receives the frequency-band reservation request from the service providing device 60 performs the frequency-band reservation process (S707 in FIG. 12) in a different way. In the first modification example, media contents provided from the service providing device 60 are transmitted to the mobile network 11 through the relaying device 35 belonging to the fixed network 12, and hence, the QoS management device 52 reserves the frequency band for the relaying device 35 in the frequency-band reservation process (S707 in FIG. 12). More specifically, the QoS management device 52 performs its frequency-band reservation process concerning the relaying device 35 and transmits the frequency-band reservation request to the relaying device 35. Thereafter, the QoS management device 52 transmits the frequency-band reservation request to the QoS management device 51 (S708 in FIG. 12).

With these processes, the relaying device 35, the QoS management device 51, and the relaying device 31 each perform the frequency-band reservation process and the frequency-band use process, whereby frequency bandwidths corresponding to the QoS policy can be secured. Then, the media contents provided from the service providing device 60 are transmitted to the user terminal 21 through the fixed core network 82, the relaying device 35, the Internet 90, the relaying device 31, and the mobile access network 71.

It should be noted that, in the first modification example, at the time of changing services and terminating the service, processes similar to those at the start of the service as described above are performed. As described above, with the first modification example having the system configuration as described above, it is possible to obtain an effect similar to that in the first exemplary embodiment and the second exemplary embodiment.

[Second Modification Example]

In the first exemplary embodiment and the second exemplary embodiment described above, an example has been given in which only one node (in-home relaying device 33) exists in the lower layer managed by the relaying device 32. However, plural nodes may exist in the lower layer managed by the relaying device 32, or plural lower-layer nodes may exist in plural layers.

Figure 15:
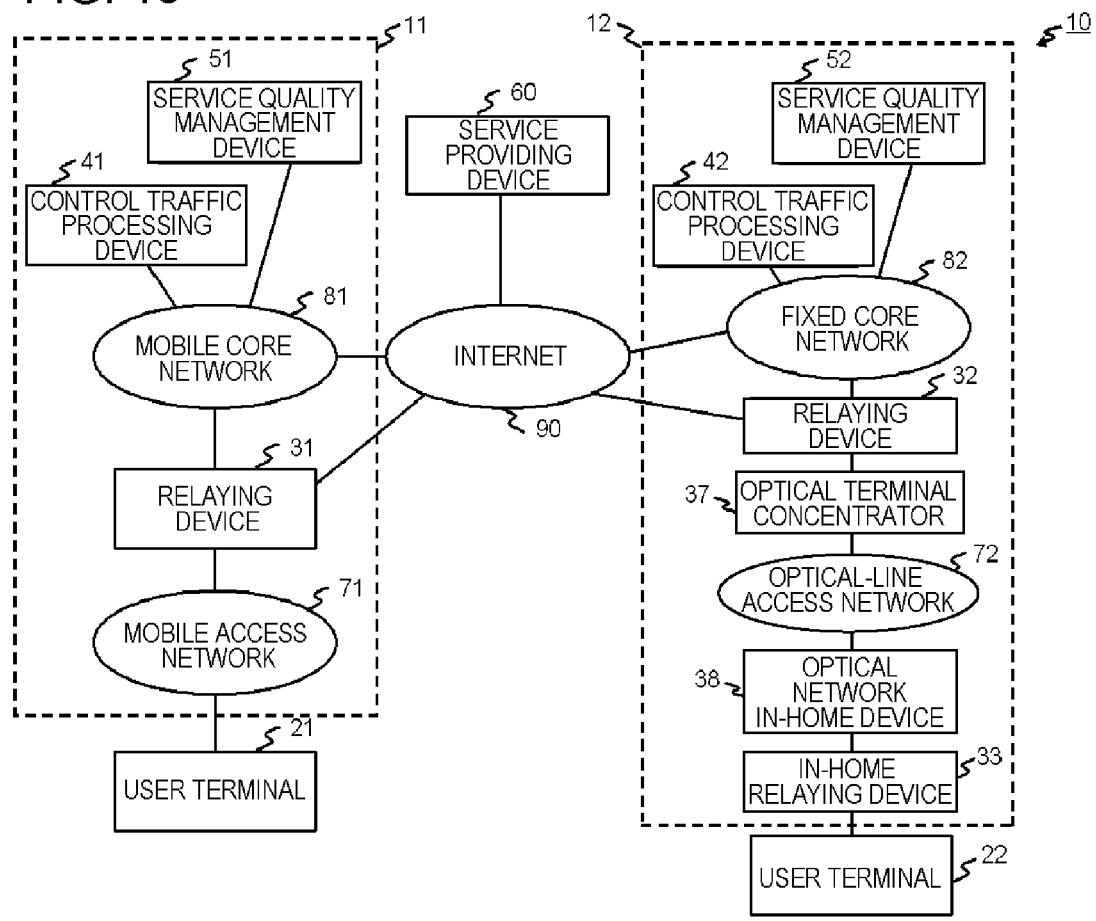
FIG. 15 is a schematic view illustrating an example of a configuration of a QoS management system according to a second modification example.

FIG. 15 is a schematic view illustrating an example of a configuration of the QoS management system 10 according to a second modification example. As illustrated in FIG. 15, in the second modification example, the fixed network 12 further includes an optical terminal concentrator 37 and an optical network in-home device 38 in addition to the configurations of the first exemplary embodiment and the second exemplary embodiment. Further, in the second modification example, an example is given in which the fixed access network 72 is an optical-line access network. The relaying device 32 manages the optical terminal concentrator 37 as well as the in-home relaying device 33, and the optical terminal concentrator 37 manages the optical network in-home device 38.

The optical terminal concentrator 37 is a concentrator on the network side of the optical-line access network 72. The optical terminal concentrator 37 has a function of relaying the upstream and the downstream traffics while controlling the frequency band of the optical transmission line in accordance with the QoS policy contained in the frequency band request transmitted from the relaying device 32, and a function of transmitting the frequency band request containing the QoS policy to the optical network in-home device 38 under management.

The optical network in-home device 38 is an in-home terminal device of the optical-line access network. The optical network in-home device 38 has, for example, part of the function of broadband optical routers for home use. The optical network in-home device 38 has a function of relaying the upstream and the downstream traffics while controlling the frequency band of the optical transmission line in accordance with the QoS policy contained in the frequency band request received from the optical terminal concentrator 37.

FIG. 16 is a sequence chart illustrating an example of an operation performed by the QoS management system 10 according to the second modification example. In the second modification example, the QoS management system 10 operates basically in a similar manner to that in the previously described exemplary embodiments. The operations after the relaying device 32 receives the frequency band request (frequency-band reservation request, frequency-band use request, request to change frequency bands, and frequency-band releasing request) from the QoS management device 52 (processes from S800 to S805) are different from those in the previously described exemplary embodiments. FIG. 16 illustrates operations at the time of reserving the frequency band.

Upon receiving the frequency-band reservation request from the QoS management device 52, the relaying device 32 performs its frequency-band reservation process (S120), and transmits the frequency-band reservation request containing a similar QoS policy, to the optical terminal concentrator 37 as well as the in-home relaying device 33 under management serving as the target for controlling the frequency band (S610 and S800).

Upon receiving the frequency-band reservation request transmitted from the relaying device 32, the optical terminal concentrator 37 performs the frequency-band reservation process in a similar manner to the relaying device 32 and the in-home relaying device 33 (S801). The optical terminal concentrator 37 transmits, to the optical network in-home device 38, the frequency-band reservation process containing a similar QoS policy because of the existence of the optical network in-home device 38 under management (S802).

As with the optical terminal concentrator 37, the optical network in-home device 38 performs the frequency-band reservation process in accordance with the QoS policy contained in the frequency-band reservation request (S803), and returns the frequency-band reservation response (S804).

As described above, according to the configuration of the second modification example, the frequency-band reservation request is delivered from the QoS management device 52 to the relaying device 32, whereby it is possible to secure the frequency bandwidth according to the QoS policy in the relaying device 32, the in-home relaying device 33, the optical terminal concentrator 37, and the optical network in-home device 38. More specifically, rather than the QoS management device 52, the relaying device 32 managed by the QoS management device 52 substantially manages the in-home relaying device 33, the optical terminal concentrator 37, and the optical network in-home device 38.

Thus, according to the second modification example, it is possible to indirectly manage the QoS policy of in-home communication networks, the number of which is now increasing, such as a set top box (STB) of an internet protocol television (IPTV) and a home gateway (HGW) in a concentrated manner, and further, to achieve the QoS control in an end-to-end manner including the in-home communication network.

[Additional Note]

In the example of the system configuration illustrated in FIG. 1, FIG. 14, and FIG. 15, an example has been given in which only the mobile network 11 and the fixed network 12 exist as the communication network containing the service quality management devices (51 and 52), the control traffic processing devices (41 and 42), and the relaying devices (31, 32, and 35). However, it may be possible to employ a configuration in which plural relaying communication networks similarly containing a service quality management device, a control traffic processing device, and a relaying device exist on the Internet 90. In this case, plural communication networks containing the service quality management device exist between the service providing device 60 and the user terminal 21 or 22. However, each of the nodes in each of the communication networks operates in a similar manner to those described in the previously described exemplary embodiments and the modification examples.

It should be noted that the exemplary embodiments have been described with reference to plural sequence charts, and plural steps (processes) are described in a sequential order. However, the order of the description of the steps does not necessarily limit the order of the process steps performed in the exemplary embodiments. In the exemplary embodiments, the order of the process steps illustrated in the drawings may be exchanged, provided that such an exchange does not impair the details of the processes.

It should be noted that, naturally, the above-described exemplary embodiments and the plural modification examples may be combined, provided that the details thereof do not contradict each other.

Part or all of the exemplary embodiments and the modification examples can be described in a manner illustrated in the Supplemental Notes below. However, the exemplary embodiments and the modification examples are not limited to the descriptions below.

[Supplementary Note 1]

A service quality management system including a first service quality management device that belongs to a first communication network and manages at least one relaying device belonging to the first communication network, a first control traffic processing device that belongs to the first communication network and processes a control traffic to provide a user terminal with a media content through the first communication network, and a service providing device that provides the media content, in which the first control traffic processing device includes:

a receiving unit that receives a service request concerning the media content from the user terminal;

an information adding unit that generates, based on the service request received by the receiving unit, a service request in which device identification information for identifying the first service quality management device belonging to a same communication network is added; and a transmitting unit that transmits, to the service providing device, the service request having the device identification information added thereto.

[Supplementary Note 2]

The service quality management system according to Supplementary Note 1, further including a second control traffic processing device that belongs to a second communication network connected to the first communication network through a predetermined communication network and processes a control traffic for providing the user terminal with the media content through the second communication network, in which the first control traffic processing device further includes an acquiring unit that acquires, from the service request received by the receiving unit, terminal identification information for identifying a user terminal currently receiving the media content through the second communication network as information on a terminal currently receiving a service, and an identifying unit that identifies the second control traffic processing device belonging to the second communication network to which the user terminal identified on the basis of the information on a terminal currently receiving a service acquired by the acquiring unit can communicate, the information adding unit of the first control traffic processing device generates a service request in which device identification information for identifying the first service quality management device is added as information on a forwarding destination device, and the transmitting unit of the first control traffic processing device transmits, to the second control traffic processing device identified by the identifying unit, the service request having the information on a forwarding destination device added thereto.

[Supplementary Note 3]

The service quality management system according to Supplementary Note 2, further including a second service quality management device that belongs to the second communication network and manages a communication resource of at least one relaying device belonging to the second communication network, the second control traffic processing device includes
a receiving unit that receives the service request forwarded from the first control traffic processing device,
an information adding unit that generates, based on the service request received by the receiving unit, a service request in which the information on a forwarding destination device added by the first control traffic processing device is added, and further, device identification information for identifying the second service quality management device belonging to a same communication network is added as information on a currently receiving device, and
a transmitting unit that transmits, to the service providing device currently providing the media content through the second communication network, the service request having the information on a forwarding destination device and the information on a currently receiving device added thereto.

[Supplementary Note 4]

The service quality management system according to any one of Supplemental Notes 1 to 3, in which
the service providing device includes
a request receiving unit that receives the service request transmitted from the first control traffic processing device,
an information retaining unit that retains, for each user, quality determining information for determining quality of service,
an information identifying unit that acquires, from the information retaining unit, the quality determining information corresponding to the service request received by the request receiving unit, and
a confirmation unit that transmits a first confirmation request containing the quality determining information acquired by the information identifying unit or a setting request for the quality determining information to a user terminal serving as a transmission source of the service request.

[Supplementary Note 5]

The service quality management system according to Supplemental Note 4, in which
the service providing device further includes
an extracting unit that extracts the device identification information from the service request received by the request receiving unit,
a frequency band request unit that transmits a frequency band request containing information on quality of service determined according to a response made from the user terminal in response to the first confirmation request transmitted from the confirmation unit, to the first service quality management device identified on the basis of the device identification information extracted by the extracting unit, and
a response receiving unit that receives a frequency band response indicating a result of a frequency band process performed by the first service quality management device and the relaying device in response to the frequency band request transmitted by the frequency band request unit, and
the confirmation unit determines, based on the frequency band response received by the response receiving unit, whether or not the result of the frequency band process satisfies the frequency band request, and transmits a second confirmation request to the user terminal serving as a transmission source of the service request if the result of the frequency band process does not satisfy the frequency band request.

[Supplementary Note 6]

The service quality management system according to Supplementary Note 5, in which
the extracting unit of the service providing device extracts the information on a forwarding destination device and the information on a currently receiving device from the service request received by the request receiving unit,
the frequency band request unit of the service providing device transmits a frequency band request containing the information on a forwarding destination device extracted by the extracting unit to the second service quality management device identified on the basis of the information on a currently receiving device extracted by the extracting unit, and
the second service quality management device includes
a frequency-band request receiving unit that receives the frequency band request transmitted from the service providing device, and
a request forwarding unit that transmits a frequency band request of which destination is set to the first service quality management device identified based on the information on a forwarding destination device if the frequency band request received by the frequency-band request receiving unit contains the information on a forwarding destination device.

[Supplementary Note 7]

A control traffic processing device that belongs to a communication network, can communicate to a service quality management device managing at least one relaying device belonging to the communication network and a service providing device providing a media content, and process a control traffic for providing a user terminal with the media content through the communication network, the control traffic processing device including:
a receiving unit that receives a service request concerning the media content from the user terminal;
an information adding unit that generates, based on the service request received by the receiving unit, a service request in which device identification information for identifying the service quality management device belonging to a same communication network; and
a transmitting unit that transmits the service request having the device identification information added thereto to the service providing device.

[Supplementary Note 8]

The control traffic processing device according to Supplementary Note 7, further including:
an acquiring unit that acquires terminal identification information for identifying a user terminal currently receiving the media content through another communication network on the basis of the service request received by the receiving unit as information on a terminal currently receiving a service; and
an identifying unit that identifies another control traffic processing device belonging to said another communication network to which the user terminal identified on the basis of the information on a terminal currently receiving a service acquired by the acquiring unit can communicate, in which
the information adding unit generates a service request in which device identification information for identifying the service quality management device is added as information on a forwarding destination device, and the transmitting unit transmits the service request having the information on a forwarding destination device added thereto to said another control traffic processing device identified by the identifying unit.

[Supplementary Note 9]

The control traffic processing device according to Supplemental Note 8, in which the receiving unit receives the service request transmitted by another control traffic processing device and having the information on a forwarding destination device added thereto, the information adding unit generates, based on the service request received by the receiving unit, a service request in which the information on a forwarding destination device added by said another control traffic processing device is added, and further, device identification information for identifying a service quality management device belonging to a same communication network is added as information on a currently receiving device, and the transmitting unit transmits the service request having the information on a forwarding destination device and the information on a currently receiving device added thereto to the service providing device currently providing the media content.

[Supplementary Note 10]

A service providing device that belongs to a communication network, can communicate with a service quality management device managing at least one relaying device belonging to the communication network and a control traffic processing device belonging to the communication network and processing a control traffic for providing a user terminal with a media content through the communication network, and provides the media content, the service providing device including:

a request receiving unit that receives, from the user terminal, a service request concerning the media content and having device identification information for identifying the service quality management device added thereto by the control traffic processing device;

an information retaining unit that retains, for each user, quality determining information for determining quality of service;

an information identifying unit that acquires the quality determining information corresponding to the service request received by the request receiving unit from the information retaining unit; and a confirmation unit that transmits a first confirmation request containing the quality determining information acquired by the information identifying unit or a setting request for the quality determining information to a user terminal serving as a transmission source of the service request.

[Supplementary Note 11]

The service providing device according to Supplementary Note 10, further including:

an extracting unit that extracts the device identification information from the service request received by the request receiving unit;

a frequency band request unit that transmits a frequency band request containing information on the quality of service determined in response to a response from the user terminal in reply to the first confirmation request transmitted by the confirmation unit to the first service quality management device identified on the basis of the device identification information extracted by the extracting unit; and a response receiving unit that receives a frequency band response indicating a result of a frequency band process performed by the first service quality management device and the relaying device in accordance with the frequency band request transmitted by the frequency band request unit, in which the confirmation unit determines on the basis of the frequency band response received by the response receiving unit whether or not the result of the frequency band process satisfies the frequency band request, and transmits a second confirmation request to a user terminal serving as the transmission source of the service request if the result of the frequency band process does not satisfy the frequency band request.

[Supplementary Note 12]

A service quality management device that can communicate with a service providing device providing a media content, belongs to a communication network, and manages at least one relaying device belonging to the communication network, the service quality management device including:

a frequency-band request receiving unit that receives a frequency band request transmitted from the service providing device;

a frequency-band control unit that updates management information on the relaying device on the basis of information on quality of service contained in the frequency band request received by the frequency-band request receiving unit; and a request forwarding unit that, if the frequency band request received by the frequency-band request receiving unit contains information on a forwarding destination device for identifying another service quality management device belonging to a communication network different from the communication network, transmits a frequency band request of which destination is said another service quality management device identified on the basis of the information on a forwarding destination device.

[Supplementary Note 13]

A service quality management method performed by a system, the system including:

a first service quality management device that belongs to a first communication network and manages at least one relaying device belonging to the first communication network;

a first control traffic processing device that belongs to the first communication network and processes a control traffic for providing a first user terminal with a media content through the first communication network;

a second control traffic processing device that belongs to a second communication network connected to the first communication network through a predetermined communication network and processes a control traffic for providing a second user terminal with a media content through the second communication network; and a service providing device that provides a media content, the service quality management method including steps executed by the first control traffic processing device, the steps of:

receiving a service request transmitted from the first user terminal;

acquiring, from the received service request, terminal identification information for identifying a user terminal currently receiving the media content through the second communication network as information on a terminal currently receiving a service;

identifying the second control traffic processing device belonging to the second communication network to which a user terminal identified on the basis of the acquired information on a terminal currently receiving a service can communicate;

generating a service request in which device identification information for identifying the first service quality management device is added as information on a forwarding destination device; and transmitting, to the identified second control traffic processing device, the service request having the information on a forwarding destination device added thereto.

[Supplementary Note 14]

The service quality management method according to Supplementary Note 13, the service quality management system further including a second service quality management device that belongs to the second communication network and manages a communication resource of at least one relaying device belonging to the second communication network, the service quality management method further including steps executed by the second control traffic processing device, the steps of:

receiving the service request transmitted from the first control traffic processing device;

generating, on the basis of the received service request, a service request in which the information on a forwarding destination device added by the first control traffic processing device is added, and further, device identification information for identifying the second service quality management device belonging to a same communication network is added as information on a currently receiving device; and transmitting the service request having the information on a forwarding destination device and the information on a currently receiving device added thereto to the service providing device currently providing a media content through the second communication network.

[Supplementary Note 15]

The service quality management method according to Supplementary Note 14, further including steps executed by the service providing device, the steps of:

extracting, from the received service request, the information on a forwarding destination device and the information on a currently receiving device; and transmitting a frequency band request containing the extracted information on a forwarding destination device to the second service quality management device identified on the basis of the extracted information on a currently receiving device, and steps executed by the second service quality management device, the steps of:

receiving the frequency band request transmitted from the service providing device; and transmitting a frequency band request of which destination is the first service quality management device identified on the basis of the information on a forwarding destination device if the received frequency band request contains the information on a forwarding destination device.

The present application claims priority based on Japanese Patent Application No. 2010-264666 filed in Japan on Nov. 29, 2010, the disclosures of which are incorporated herein by reference in their entirety.

What is claimed is:

1. A service quality management system comprising:
a first service quality management device that belongs to a first communication network and manages a communication resource of at least one relaying device belonging to the first communication network,
a first control traffic processing device that belongs to the first communication network and processes control traffic providing a first user terminal with media content through the first communication network,
a service providing device that provides the media content, a second control traffic processing device that belongs to a second communication network, connected to the first communication network through a predetermined communication network, and which processes control traffic providing a second user terminal with the media content through the second communication network,
a second service quality management device that belongs to the second communication network and manages a communication resource of at least one relaying device belonging to the second communication network,
the service providing device comprising a processor and a memory having stored therein instructions which, when executed by the processor enable the processor to implement:
a request receiver that receives the service request transmitted from the first control traffic processing device;
an extractor that extracts the first device identification information from the service request received by the request receiver;
a frequency-band requestor that transmits a frequency band request, comprising the first device identification information extracted by the extractor, to the second service quality management device identified based on the second device identification information extracted by the extractor;
the second service quality management device comprising a processor and a memory having stored therein instructions which, when executed by the processor enable the processor to implement:
a frequency-band request receiver that receives the frequency band request transmitted from the service providing device, and
a request forwarder that transmits a frequency band request of which destination is the first service quality management device, indentified based on the first device identification information contained in the frequency band request received by the frequency-band request receiver;
the first service quality management device comprising a processor and a memory having stored therein instructions which, when executed by the processor enable the processor to implement:
a frequency-band request receiver that receives the frequency band request transmitted from the second service quality management device; and
a frequency-band controller that performs a frequency-band reservation process together with the at least one relaying device under the control of the first service quality management device based on the frequency band request received by the frequency-band request receiver.

2. The service quality management system according to claim 1,
wherein the first control traffic processing device further comprises a processor and a memory having stored therein instructions which, when executed by the processor enable the processor to implement:
a receiver that receives the service request concerning the media content from the first user terminal;
an acquirer that acquires, from the service request received by the receiver, terminal identification information for identifying the second user terminal currently receiving the media content through the second communication network as information on a terminal currently receiving a service; and an identifier that identifies the second control traffic processing device belonging to the second communication network to which the second user terminal identified on the basis of the information on a terminal currently receiving a service acquired by the acquirer can communicate;

an information adder that generates, based on the service request received by the receiver, a service request in which the first device identification information for identifying the first service quality management device belonging to the same communication network and the information on a terminal currently receiving a service are added; and a transmitter that transmits the generated service request to the second control traffic processing device identified by the identifier.

3. The service quality management system according to claim 2, wherein the second control traffic processing device comprises a processor and a memory having stored therein instructions which, when executed by the processor enable the processor to implement:

a receiver that receives the service request forwarded from the first control traffic processing device;

an information adder that generates, based on the service request received by the receiver, a service request in which the first device identification information added by the first control traffic processing device is added, and further, the second device identification information for identifying the second service quality management device belonging to a same communication network is added; and a transmitter that transmits, to the service providing device currently providing the media content through the second communication network, the service request generated by the information adder.

4. The service quality management system according to claim 1, the service providing device further implementing:

an information retainer that retains, for each user, quality determining information for determining quality of service;

an information identifier that acquires, from the information retainer, the quality determining information corresponding to the service request received by the request receiver; and a confirmer that transmits a first confirmation request containing the quality determining information acquired by the information identifier or a request to set the quality determining information to the first user terminal serving as transmission source of the service request.

5. The service quality management system according to claim 4, the service providing device further implementing:

a receiver that receives a frequency band response indicating a result of a frequency band process performed by the first service quality management device and the at least one relaying device in response to the frequency band request transmitted by the frequency band requester, wherein the confirmer determines, based on the frequency band response received by the response receiver, whether or not the result of the frequency band process satisfies the frequency band request, transmits a second confirmation request to the first user terminal serving as a transmission source of the service request if the result of the frequency band process does not satisfy the frequency band request.

6. A service quality management method performed by a system, the system comprising:

a first service quality management device that belongs to a first communication network and manages a communication resource of at least one relaying device belonging to the first communication network;

a first control traffic processing device that belongs to the first communication network and processes a control traffic for providing a first user terminal with a media content through the first communication network;

a second control traffic processing device that belongs to a second communication network connected to the first communication network through a predetermined communication network and processes a control traffic for providing a second user terminal with a media content through the second communication network;

a second service quality management device that belongs to the second communication network and manages a communication resource of at least one relaying device belonging to the second communication network; and a service providing device that provides a media content, the service quality management method comprising the service providing device:

receiving a service request concerning the media content from the first user terminal, the service request containing first device identification for identifying the first service quality management device and second device identification information for identifying the second service quality management device;

extracting the first and second device identification information from the received service request; and transmitting a frequency band request containing the extracted first device identification information to the second quality management device identified based on the extracted second device identification information, the service quality management method further comprising the second service quality management device:

receiving the frequency band request transmitted from the service providing device; and transmitting a frequency band request of which destination is the first service quality management device identified based on the first device identification information contained in the received frequency band request, the service quality management method further comprising the first service quality management device:

receiving the frequency band request transmitted from the second service quality management device; and performing a frequency-band reservation process together with the at least one relaying device under the control of the first service quality management device based on the received frequency band request.

* * * * *